United States Patent
Besiris et al.

(10) Patent No.: US 9,547,800 B2
(45) Date of Patent: Jan. 17, 2017

(54) SYSTEM AND A METHOD FOR THE DETECTION OF MULTIPLE NUMBER-PLATES OF MOVING CARS IN A SERIES OF 2-D IMAGES

(71) Applicant: IRIDA LABS S.A., Patras (GR)

(72) Inventors: Dimitrios Besiris, Patras (GR); Nikos Fragoulis, Patras (GR)

(73) Assignee: IRIDA LABS S.A., Patras (GR)

( * ) Notice: Subject to any disclaimer, the term of this patent is extended or adjusted under 35 U.S.C. 154(b) by 0 days.

(21) Appl. No.: 15/201,987

(22) Filed: Jul. 5, 2016

(65) Prior Publication Data

US 2016/0314368 A1    Oct. 27, 2016

Related U.S. Application Data

(62) Division of application No. 14/096,287, filed on Dec. 4, 2013, now abandoned.

(51) Int. Cl.
| | |
|---|---|
| G06K 9/00 | (2006.01) |
| G06K 9/32 | (2006.01) |
| G06K 9/62 | (2006.01) |
| G06K 9/46 | (2006.01) |
| G06F 17/30 | (2006.01) |

(52) U.S. Cl.
CPC ......... *G06K 9/325* (2013.01); *G06F 17/30256* (2013.01); *G06K 9/4604* (2013.01); *G06K 9/6267* (2013.01); *G06K 2209/15* (2013.01)

(58) Field of Classification Search
CPC ..... G06K 9/325; G06K 9/6267; G06K 9/4604
See application file for complete search history.

(56) References Cited

U.S. PATENT DOCUMENTS

| | | | | |
|---|---|---|---|---|
| 5,425,108 A | * | 6/1995 | Hwang | G06K 7/14 382/105 |
| 7,231,065 B2 | * | 6/2007 | Peach | G06K 9/3258 382/104 |
| 7,406,212 B2 | * | 7/2008 | Mohamed | G06K 9/4633 382/248 |
| 7,447,362 B2 | * | 11/2008 | Lev | G06K 9/228 382/200 |

(Continued)

OTHER PUBLICATIONS

Appiaha, Kofi, et al. "Accelerated Hardware Object Extraction and Labeling: from Object Segmentation to Connected Components Labeling", Preprint submitted to Computer Vision and Image Understanding Aug. 22, 2009.

(Continued)

*Primary Examiner* — Shefali Goradia
(74) *Attorney, Agent, or Firm* — Jason H. Vick; Sheridan Ross, PC

(57) ABSTRACT

A stand-alone computer-camera system capable of extracting car-plate information. This is achieved by using an on-board computer in order to analyze the video stream recorded by the camera sensor, and can be used with any type of camera sensor. The system features specific characteristics making it extremely fast and able to catch plates of cars moving at high-speed. The special algorithms incorporated in this system, are specially implemented, in order to be able to be ported on an embedded computer system, which has usually lower capabilities in terms of processing power and memory than a general-purpose computer.

9 Claims, 18 Drawing Sheets

(56) References Cited

U.S. PATENT DOCUMENTS

| | | | | |
|---|---|---|---|---|
| 7,504,965 | B1 * | 3/2009 | Windover | G08G 1/0175 340/933 |
| 7,868,912 | B2 * | 1/2011 | Venetianer | G06F 17/30799 348/143 |
| 7,999,857 | B2 * | 8/2011 | Bunn | G10L 15/25 348/143 |
| 8,238,610 | B2 * | 8/2012 | Shah | G06T 7/0042 382/104 |
| 8,879,796 | B2 * | 11/2014 | Rodriguez Serrano | G06K 9/325 382/105 |
| 2012/0269398 | A1 * | 10/2012 | Fan | G06K 9/3258 382/105 |
| 2015/0154463 | A1 | 6/2015 | Besiris et al. | |

OTHER PUBLICATIONS

Athimethphat, M. "A Review on Global Binarization Algorithms for Degraded Document Images", AU J.T. 14(3): 188-195 (Jan. 2011).
Gonzalez, R.C. et al. "Digital Image Processing", pp. 514-516, Addison-Wesley, 1993.
Kapur, J.N. et al. "A New Method for Gray-Level Picture Thresholding Using the Entropy of the Histogram", Computer Vision, Graphics and Image Processing, 29, 273-285, 1985.
Ma, Ni et al. "Optimized Single Pass Connected Components Analysis" IEEE International Conference on Field-Programmable Technology, 2008, pp. 185-192.
Wikipedia "Sobel Operator", available at http://en.wikipedia.org/wiki/Sobel_operator, printed Jan. 3, 2014.
Office Action for U.S. Appl. No. 14/096,287, mailed Sep. 1, 2015.
Office Action for U.S. Appl. No. 14/096,287, mailed Mar. 10, 2016.

* cited by examiner

SYSTEM AND A METHOD FOR THE DETECTION OF MULTIPLE NUMBER-PLATES OF MOVING CARS IN A SERIES OF 2-D IMAGES

CROSS REFERENCE TO RELATED APPLICATIONS

This application is a Divisional of U.S. patent application Ser. No. 14/096,287, filed Dec. 4, 2013, entitled "System and a Method for the Detection of Multiple Number-Plates of Moving Cars in a Series of 2-D Images," the entirety of which is incorporated herein by reference.

BACKGROUND

1. Field

An exemplary embodiment of this invention relates to the field of the detection of Automatic Number Plate Recognition (ANPR) systems. More specifically an exemplary embodiment of the invention relates to a method and a system capable of extracting the location of the car number-plate from a series of 2-D images, using a device equipped with a camera of any kind.

2. Description of the Related Art

There are many known devices that are able to detect the location of the number plate of a car and then recognize the plate-number producing at the output an alphanumeric text corresponding to the characters of the plate number.

There are many approaches for performing car-plate detection and recognition. Most of these systems are based on a Personal Computer to carry out the required processing tasks. In such systems a video digitizer samples the camera sensor and a PC, which runs the car-plate detection and recognition software, then processes the data. However these implementations are not easily portable, are bulky in size, require special power-supply and are difficult to install on site.

When ANPR systems are used for recognizing plates of moving cars in highway roads, another important characteristic is the recognition speed. In order to be able to catch fast-moving cars, the plate detector must be able to analyze very fast every frame in the video sequence. The detection speed depends on the algorithm and the processor speed. Today's common processors or even dedicated digital signal processor (DSP) devices are not able to deliver the required performance.

SUMMARY

An exemplary embodiment of the invention refers to a stand-alone computer-camera system capable of extracting car-plates. This is achieved by using an on-board computer in order to analyze the video stream recorded by the camera sensor, and can be used with any type of camera sensor. The system features specific characteristics making it extremely fast and able to catch plates of cars moving at high-speed.

The special algorithms incorporated in this system, are specially implemented, in order to be able to be ported on an embedded computer system, which has usually lower capabilities in terms of processing power and memory than a general-purpose computer.

BRIEF DESCRIPTION OF THE DRAWINGS

The exemplary embodiments of the invention will be described in detail, with reference to the following figures, wherein.

DETAILED DESCRIPTION

Figure 1:
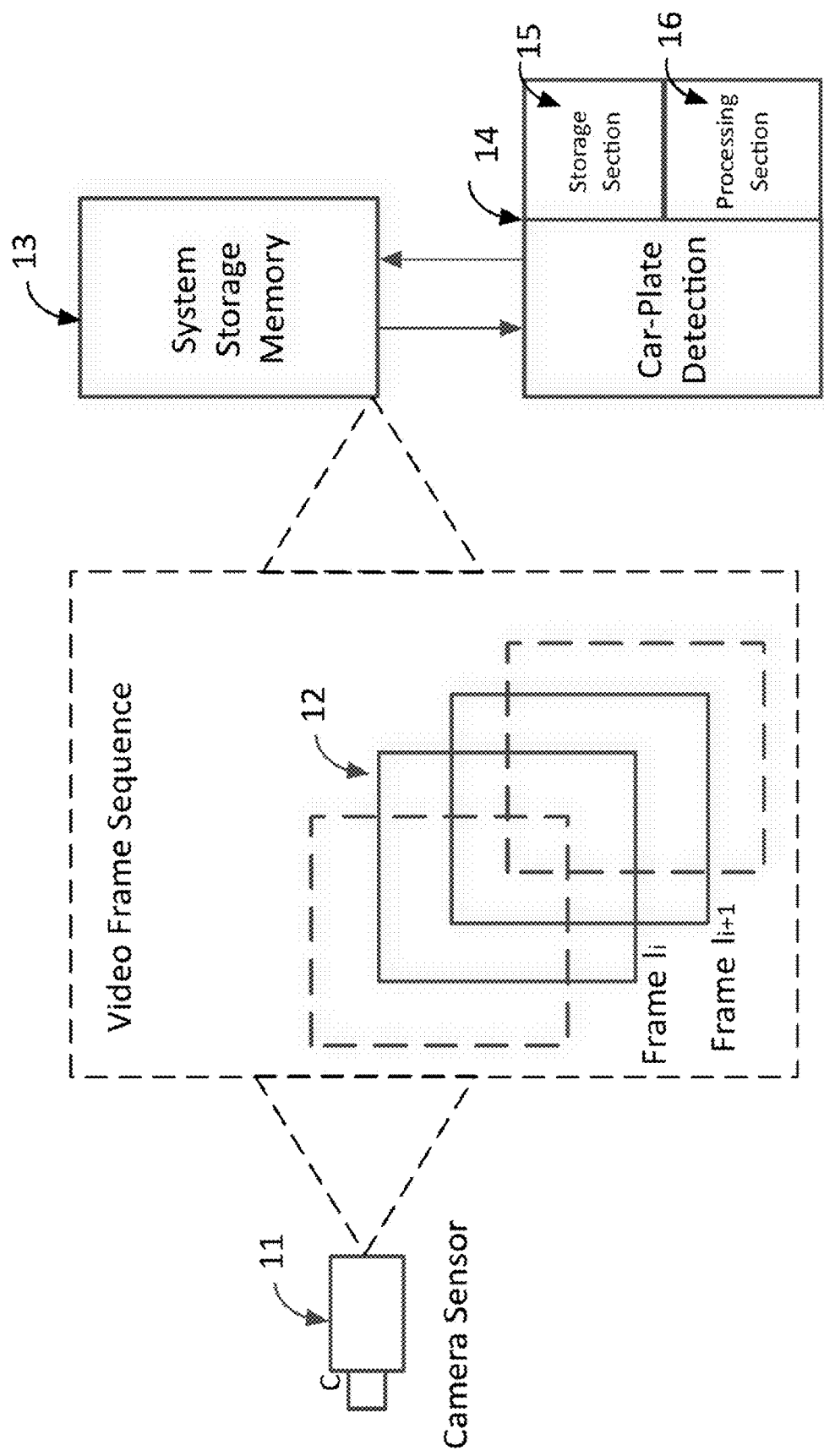
FIG. 1 illustrates an exemplary car plate location information extraction system.

In the current description we refer to the detection of multiple car-plates from a video sequence and the extraction of the coordinates of each plate. In accordance with an exemplary embodiment of the present invention, location information of car-plates is extracted from an image frame sequence by using a system like the one shown in FIG. 1. This system uses a camera sensor (11 in FIG. 1) which captures the video frames (12 in FIG. 1), stores the most recent frame in a memory (13 in FIG. 1) and then processes it with a car-plate detection device (14 in FIG. 1), comprised by a storage section (15 in FIG. 1) and a processing section (16 in FIG. 1) in order to extract carplates.

Figure 2:
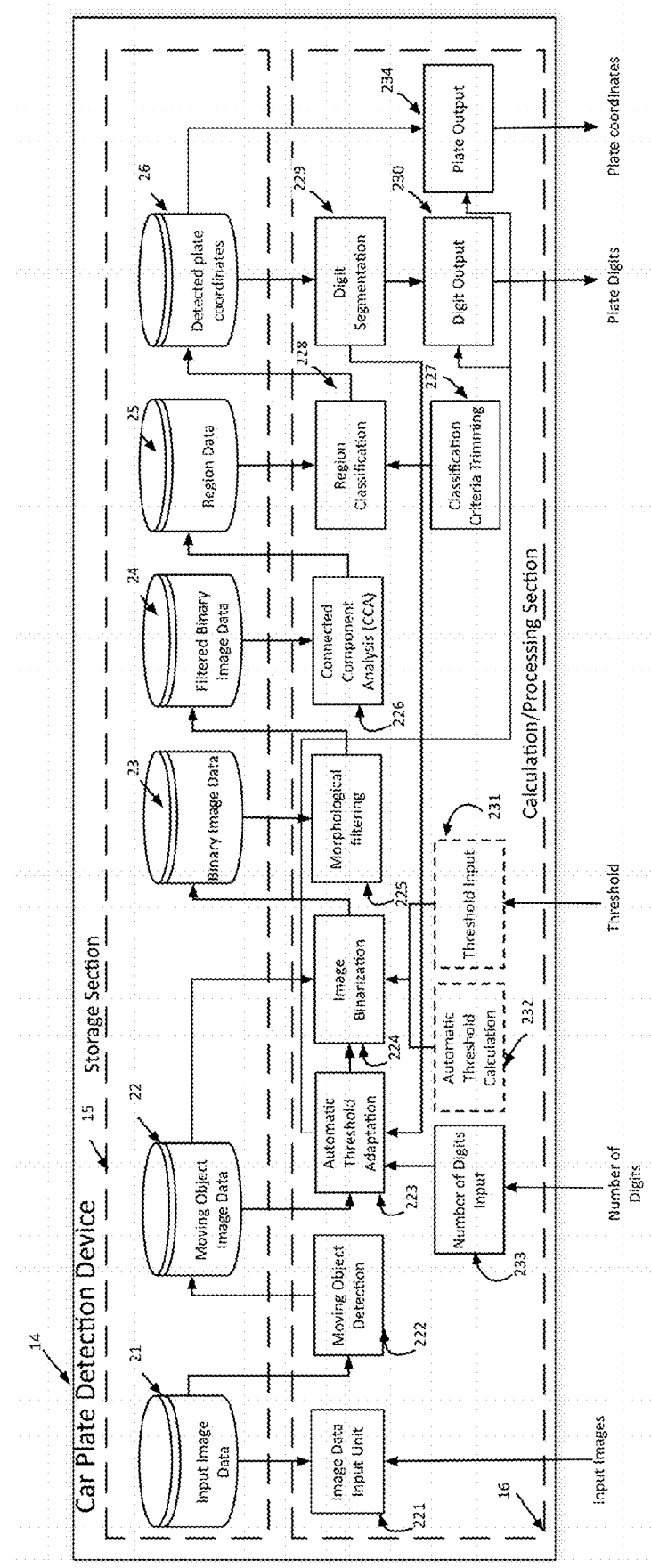
FIG. 2 illustrates an exemplary Car Plate Detection Device through which the system detects car-plates and extracts the information of the coordinates.

The Car Plate Detection Device through which the system detects car-plates and extracts the information of the coordinates is shown in FIG. 2.

This exemplary system functions as follows: First two consecutive frames $I_i$ and $I_{i+1}$, (12 in FIG. 1) are input into the Image Data Input Unit (221 in FIG. 2) from the Storage Memory (13 in FIG. 1) and are temporarily stored into the Input Image Data memory (21 in FIG. 2). The data are then fed into the Moving Object Detection unit (222 in FIG. 2), which detects the parts of video frames corresponding to moving objects at any time and stores the corresponding parts of the video frames into the moving object image data memory (22 in FIG. 2). Data from the Moving Object Image Data memory are then fed into the Automatic Threshold Adaptation unit (223 in FIG. 2), which calculates the optimal local binarization threshold parameter. This unit takes also input from the Digit Segmentation Unit (229 in FIG. 2) and from the Number of Digits Input unit (233 in FIG. 2). This unit then feeds the threshold parameter into the Image Binarization unit (224 in FIG. 2), to binarize the moving object image data, which it gets from the moving object image data memory (22 in FIG. 2) and stores in the Binary Image Data memory (23 in FIG. 2). The Image Binarization unit (224 in FIG. 2) can optionally get data from the user through the Threshold Input Unit (231 in FIG. 2), or through the Automatic Threshold Calculation unit (232 in FIG. 2).

Data from Binary Image Data memory are then fed to the Morphological Filtering unit (225 in FIG. 2), for filtering of unwanted noise and storing the filtered image data in the filtered Binary Image Data memory (24 in FIG. 2). Data from this memory are input to the Connected Component Analysis (CCA) unit (226 in FIG. 2), which analyzes the binary data to find blocks of pixels corresponding to regions (Blobs) and then stores the results in the Region Data Memory (25 in FIG. 2).

The next step is the classification of the blobs in order to identify the car plates. This procedure takes place into the Region Classification unit (228 in FIG. 2) which analyzes the data previously stored in the Region Data memory (25 in FIG. 2), using classification criteria defined by the user through the Classification Criteria Trimming unit (227 in FIG. 2). The output of the Region Classification unit, which is the plate coordinates are stored in the detected plate coordinates memory (26 in FIG. 2).

The results of this extraction are then fed into the Plate Output unit (234 in FIG. 2), which outputs the plates to the system output when the Automatic Threshold Adaptation unit (223 in FIG. 2) indicates that the right number of digits have been detected.

A final step of processing concerns the segmentation of the plate digits that exist in the detected plate. This procedure takes place within the Digit Extraction Unit (229 in FIG. 2).

The results of this extraction are then fed into the Digit Output unit (230 in FIG. 2), which outputs the digits to the system output when the Automatic Threshold Adaptation unit (223 in FIG. 2) indicates that the right number of digits have been detected.

In the following paragraphs the above-referred units are explained analytically.

Moving Object Detection Unit (227 in FIG. 2).

This unit detects the motion of pixels from consecutive video frames. The target is to identify one or more moving cars in a steady background as viewed by the camera. The background corresponds to the view of the camera when no car is present and nothing else moves. However this complete absence of motion rarely occurs under real world conditions and therefore the background is instead modeled according to a background model. The background model is actually an image obtained using some statistical methodology, which incorporates any minor differences that may occur due to slight variations in lighting conditions, electronic noise from some camera sensor, or due to some minor motions inherent in the video scene (e.g. tree leaves moving due to a blowing wind).

Figure 3:
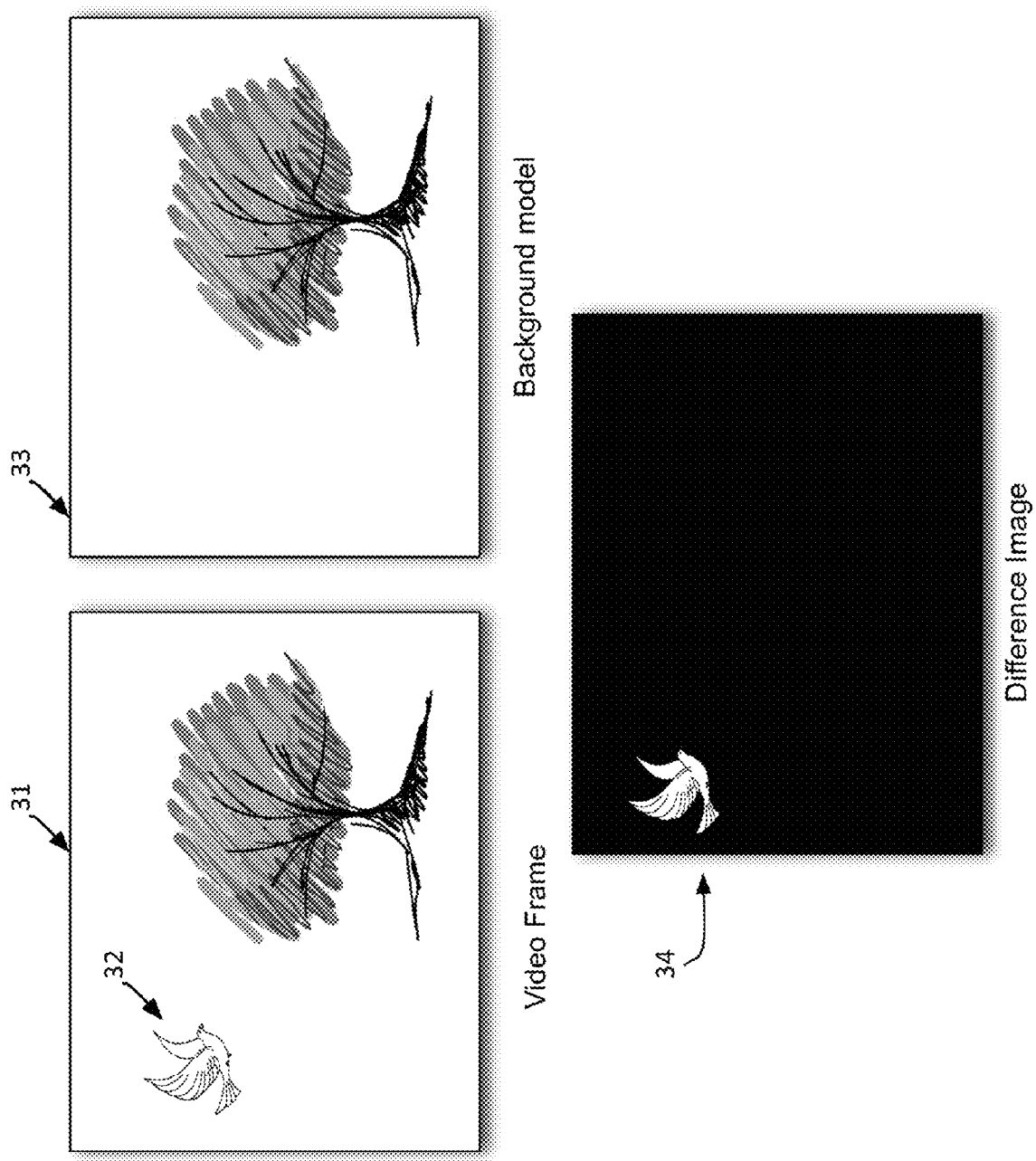
FIG. 3 illustrates how moving pixels are identified.

Given the background model, any moving pixels can be identified in a video frame by subtracting the background model from this particular frame. Therefore referring to FIG. 3, the moving pixels (32 and 34 in FIG. 3) corresponding to a moving object within this video sequence are identified by subtracting the background model image (33 in FIG. 3) from the current frame (31 in FIG. 3).

As the motion in the current frame becomes more intense, more pixels are different from the background model.

Figure 4:
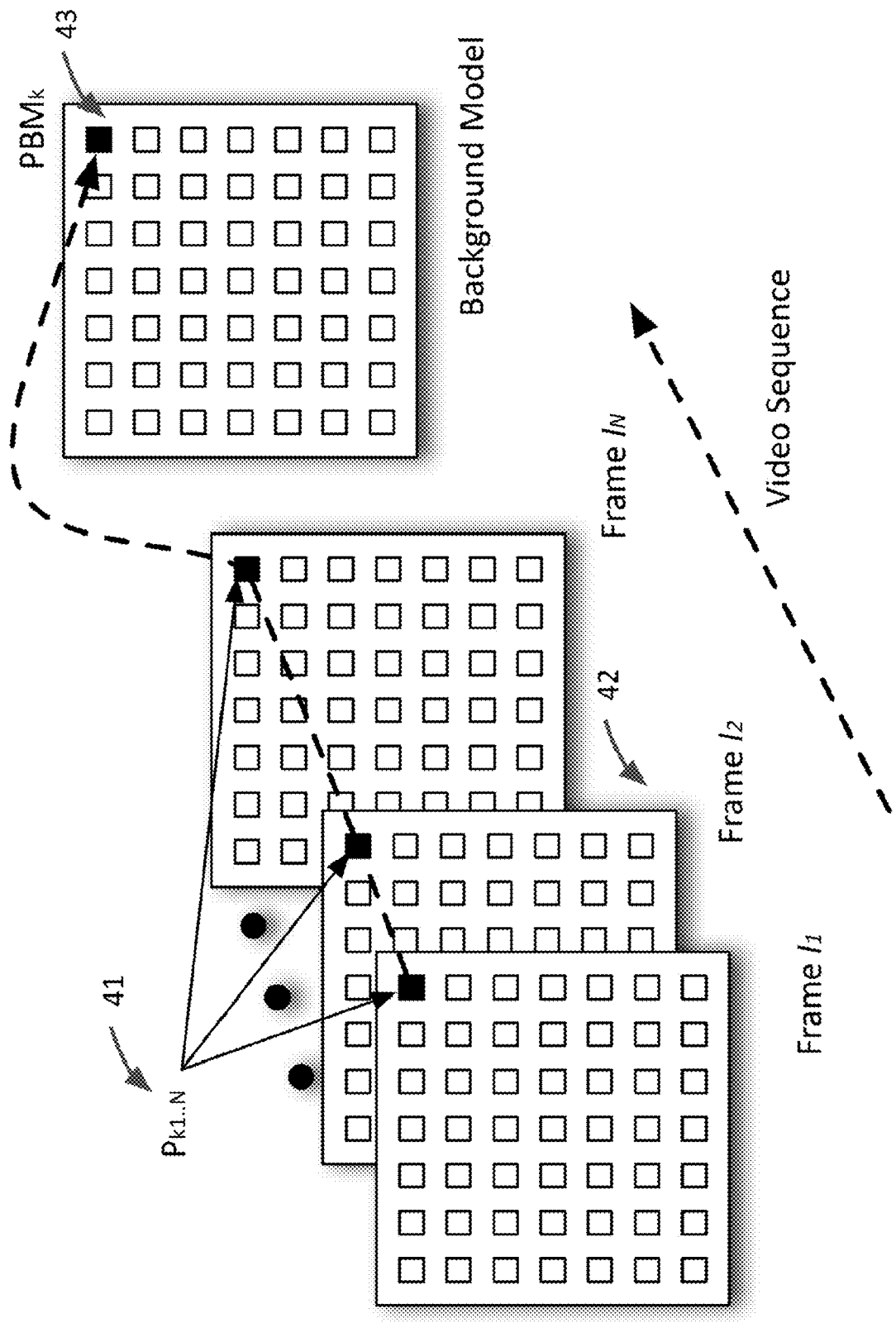
FIG. 4 illustrates how each pixel in the background model is modeled through the use of the corresponding pixels of some consequent frames.

The calculation of the background model can be achieved using statistical techniques: Each pixel in the background model is modeled through the use of the corresponding pixels of some consequent frames as shown in FIG. 4. More specifically, each pixel $PBM_k$ in the background model (43 in FIG. 4) results in a statistical measure of the central tendency of the pixel population which is constituted by the pixels $P_{k1 \ldots N}$ (41 in FIG. 4) in the consecutive video sequence frames $I_1 \ldots I_N$ (42 in FIG. 4) having the same coordinates as $PBM_k$. Possible statistical measures of the central tendency include the mean value, the median value and the mode value. However in order to be able to use this central tendency measure, a number of consecutive video frames must be stored in a buffer memory and this constitutes a significant problem in the case that the system is targeted to be implemented as an embedded system. In an embedded system the memory is usually limited and therefore this type of implementation is not feasible. The calculation of the mean value may be an exception to this problem since it is possible to be calculated as the running mean. The running mean value is calculated progressively as follows:

$$PBM_k = 0.5 PBM_k + 0.5 P_k, \quad i=1 \ldots N \quad (1a)$$

In an exemplary embodiment, a weighted average measure is used described by the following relation:

$$PBM_k = a PBM_k + (1-a) P_{ki}, \quad i=1 \ldots N \quad (2a)$$

The difference between equations (1a) and (2a) is the parameter $\alpha$, which in the case of running average takes on the value 0.5. Values of $\alpha$ smaller than 0.5, make the system to be more robust to background changes. In this case the background model change faster or equivalently the system has limited memory and is able to forget its history. As parameter $\alpha$ gets smaller, the background model changes faster.

More specifically, the procedure of detecting a car-plate is the following: As a first step, the background model BM is calculated. In the first iteration, the background model is initialized with a zero value for every pixel (52 in FIG. 5). Then, the background model is calculated (53 in FIG. 5) using eq. 2a.

Figure 5:
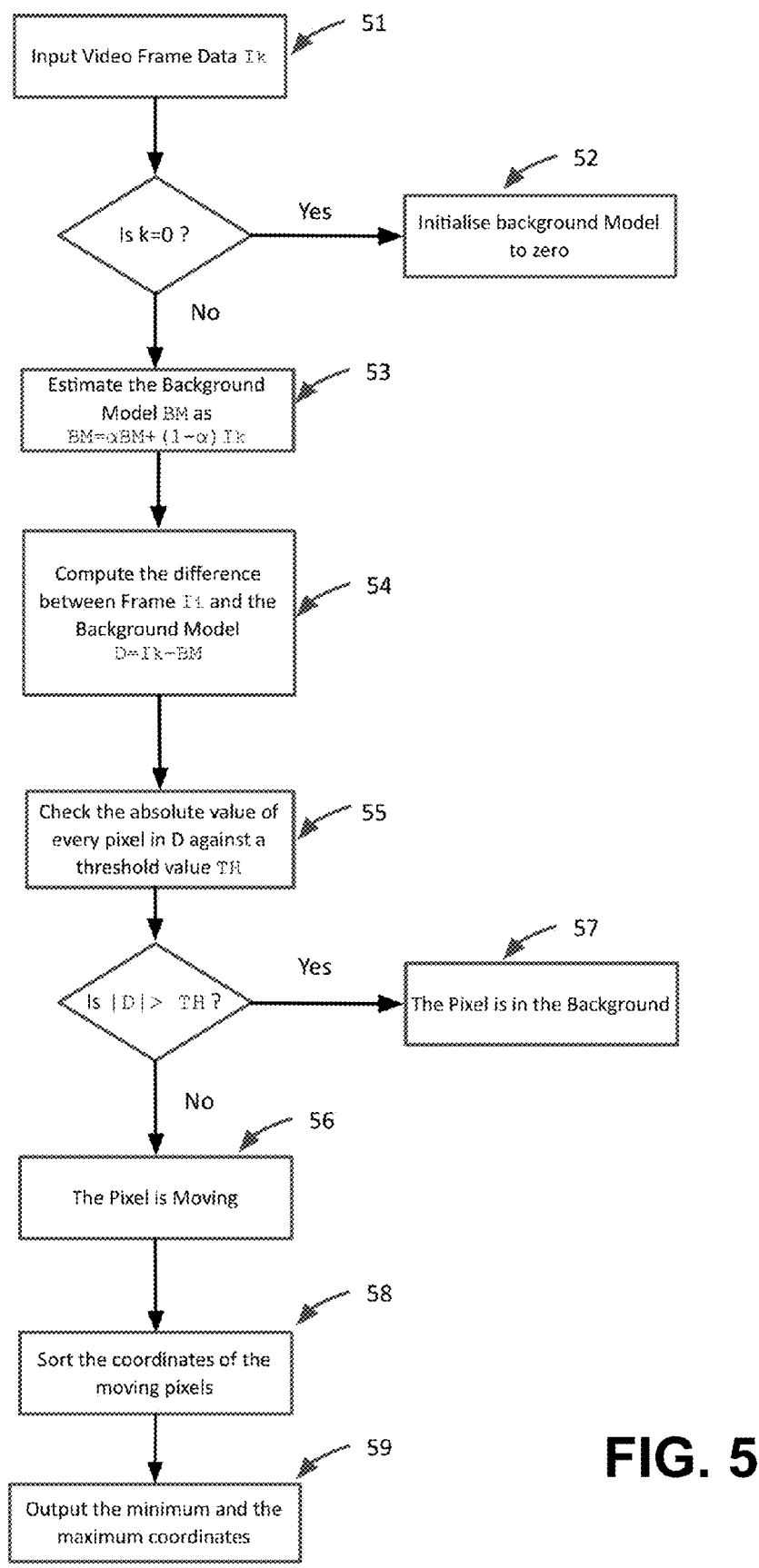
FIG. 5 illustrates a flow-chart showing an exemplary method for detecting a car-plate.

The background model is then subtracted from the current frame (54 in FIG. 5). Finally the absolute value of the difference is checked for every pixel against a threshold TH and the corresponding pixel is categorized as background if $D_k < TH$ and as moving object if $D_k > TH$ (56 and 57 in FIG. 5). The parameter TH plays the role of motion sensitivity. The larger the parameter TH the less sensitive the system will be to small motions. This is a very useful feature since it controls the response of the system in noisy conditions where there are small motions distributed across the entire frame area, corresponding to conditions such as rain, wind etc.

Figure 6:
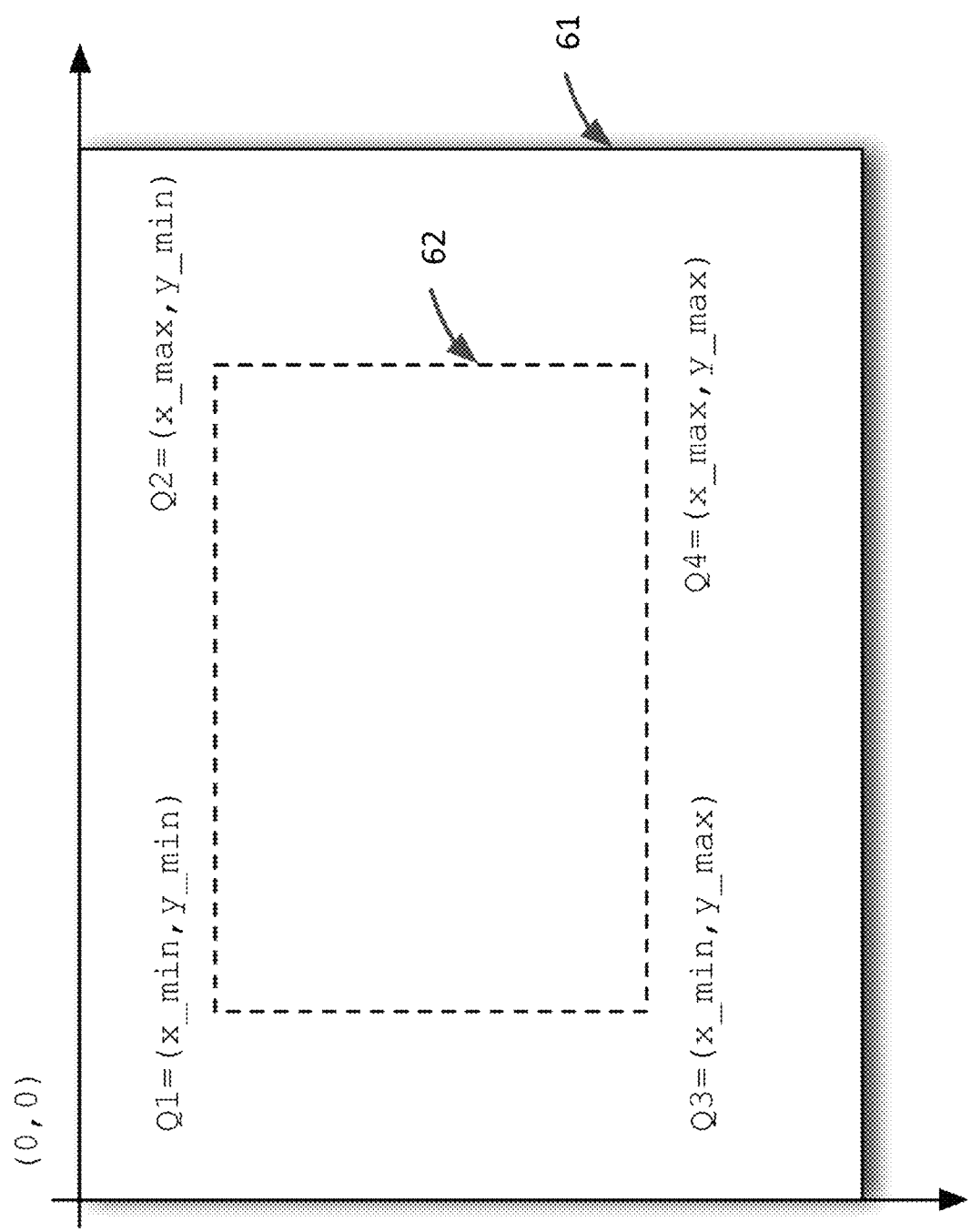
FIG. 6 illustrates an exemplary moving portion of the video frame.

As a final step, the system outputs the coordinates of the moving object using the following procedure: First all the coordinates of the pixels characterized as «moving» are sorted (58 in FIG. 5). From this procedure the minimum and maximum coordinates in the x-direction (x_min and x_max) as well as the minimum and maximum coordinates in the y-direction (y_min and y_max) are computed. Then, rectangle $Q_1 Q_2 Q_3 Q_4$ is formed (62 in FIG. 6), representing the moving portion of the video frame (61 in FIG. 6), with the corner points $Q_1$ having the following coordinates: Q1=(x_min, y_min) Q2=(x_max, y_min), Q3=(x_min, y_max) Q4=(x_max, y_max).

Image Binarization unit (224 in FIG. 2)

The Binarization unit (224 in FIG. 2) focuses on the binarization of the input image. A binarization procedure is considered the formation of a new image having pixels with only two possible values. In the context of the current invention these values can be either 0 (black) or 255 (white).

The binarization procedure employs the comparison of each pixel in the image with a threshold value TH_bin and then forms a new binary image having a one to one correspondence with the initial image described as follows: Pixels in the original image with a value greater than TH_bin correspond to pixels with value 255 in the binary image and pixels in the original image with a value lower than TH_bin correspond to pixels with value 0 in the binary image.

However binarization using a global threshold is not an optimal solution. A major problem with global thresholding is that changes in illumination across the scene may cause some parts to be brighter (in the light) and some parts darker (in shadow) in ways that have nothing to do with the objects in the image.

Such uneven illumination can be handled by determining thresholds locally. That is, instead of having a single global threshold, we allow the threshold itself to smoothly vary across the image.

Local Thresholding

In the current invention, we use a local thresholding method, which uses local edge properties in a window to compute threshold.

Automatic Threshold Adaptation Unit (223 in FIG. 2)

The selection of the threshold in the Image Binarization unit is a very critical task, since it influences the content of the binary image and finally the precision of the detection system. Usually the value of this threshold changes with the content of the image or with the lighting conditions. Therefore the use of a constant (global or local) threshold, although an option, is not optimal. To this end an automatic threshold adaptation unit is included in the system described in the current invention. The system is able to adapt a global or local threshold according to the results of the detection process.

In an exemplary embodiment, a local thresholding approach is used which employs threshold adaptation using feedback from the system output and more specifically from the Digit Segmentation unit (229 in FIG. 2).

More specifically the unit functions as follows: For every frame $I_k$ (71 in FIG. 7) an edge-map is obtained (76 in FIG. 7).

An edge map is defined as an image containing image edges. An image edge is a point in a digital image at which the image brightness changes sharply or, more formally, has discontinuities. The points at which image brightness changes sharply are typically organized into a set of curved line segments termed edges.

Edge detection is the process of obtaining the edge-map of an image. The detection process typically employs the filtering of an image by convolving a standard matrix known as an "operator" with the image. This filtering process results in an image having increased intensity for the pixels belonging to an edge and decreased intensity for pixels not-belonging to an edge. Usually as a final step, the binary edge map is obtained by applying binarization, using thresholding, to the edge-map image. This results in an image which has white pixels at the edges and black pixels everywhere else.

Figure 7:
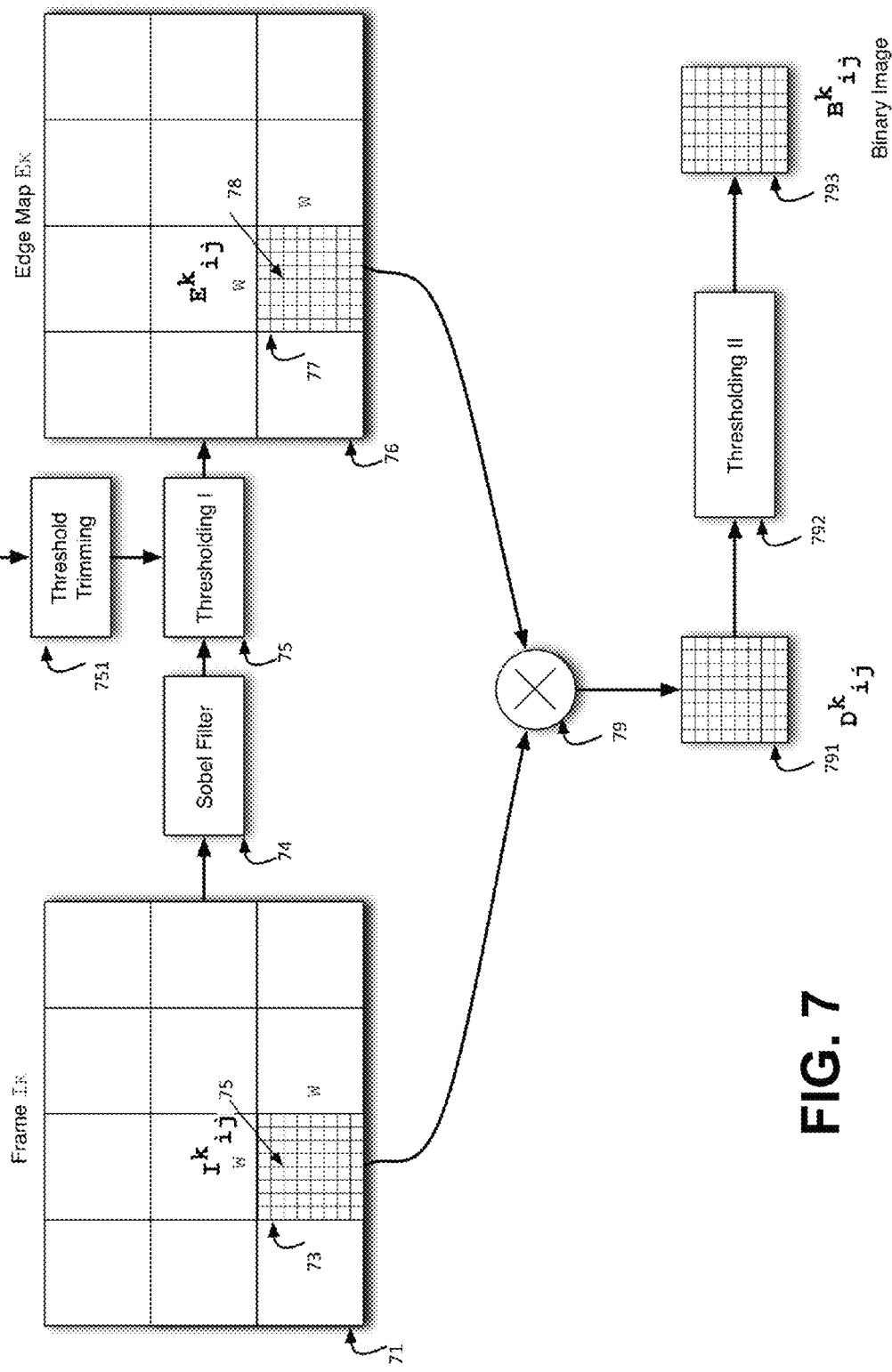
FIG. 7 illustrates an exemplary local thresholding approach which is used which employs threshold adaptation using feedback from the system output and more specifically from the Digit Segmentation unit.

In an exemplary embodiment, the binary edge map (76 in FIG. 7) of frame $I_K$ (71 in FIG. 7) is obtained by first applying an edge filtering using a Sobel operator (74 in FIG. 7)[1] and then binarization using thresholding (75 in FIG. 7). The threshold value for the binarization unit is obtained from the Threshold Trimming sub-system (751 in FIG. 7) described below.

The Threshold Trimming sub-system functions as follows: An arbitrary, pre-determined initial threshold value THRES_1=THRES_1$_{INI}$ is set. To be equal to the smaller integer number which is closest to the value $2^{Nb}/2$, where Nb is the number of bits used to represent the pixel value (e.g for 8 bits representation this number equals 127). The plate detection and digit segmentation process is then run and when the plate detection and the digit segmentation process is finished, the number of detected digits is fed from the Digit Segmentation unit (229 in FIG. 2) and the required number of digits that must be detected is input from the Number of Digits Input unit (233 in FIG. 2). If the number of the detected digits is smaller than the required number of digits, the threshold value THRES_1 is decreased and the detection is re-initiated. If the number of the detected digits is higher than the required number of digits, the threshold value THRES_1 is increased and the detection is re-initiated. This process is repeated until the number of the detected digits is equal to the required number of digits.

Each threshold from Threshold Trimming sub-system is fed to the Thresholding I sub-system (75 in FIG. 7), which binarizes the edge map by using thresholding, to obtain the binary edge map $J_K$ (76 in FIG. 7).

As a next step, the Input Frame $I_K$ and the binary edge map $E_K$ is partitioned into a number $N_{BX} \times N_{BY}$ blocks of dimensions W×W pixels each. Then for every from frame $I_K$ the following procedure takes place iteratively for every frame $I^K_{ij}$ (75 in FIG. 7):

The block $I^K_{ij}$ is taken (75 in FIG. 7) and from the binary image $E_K$ the corresponding block $E_{ij}$ block is taken (78 in FIG. 7). For each of these blocks a binarization process is then taking place as follows: First the $I^K_{ij}$ block (75 in FIG. 7) is multiplied (79 in FIG. 7) with the corresponding $E^K_{ij}$ block (78 in FIG. 7) of binary Image $E_K$. The resulting block $D^K_{ij}$ (791 in FIG. 7) is a semi-binary image, containing pixels having the gray-scale value of the corresponding pixel in $I^K_{ij}$ when the corresponding pixel in $E^K_{ij}$ has a non-zero value (e.g. the pixel is on an edge) and zero everywhere else.

The next step is the binarization of this semi-binary block $D^K_{ij}$ by applying a thresholding scheme (792 in FIG. 7), using a threshold calculated by the following formula:

$$\text{THRES\_2} = \Sigma_x{}^W \Sigma_y{}^W D_{ij}^{xy} \quad (1)$$

where $D_{ij}^{xy}$ is the pixel in x-th column and the y-th row of the $D^K_{ij}$ block. The result is a binary version $B^K_{ij}$ (793 in FIG. 7) of the block $I^K_{ij}$ of the video frame $I_K$.

Automatic Threshold Calculation Unit (232 in FIG. 2)

Alternative to automatic threshold adaptation, an automatic Threshold Calculation unit can be used. To this end a global threshold calculation algorithm can be used which can lead to acceptable performance.

There are a few automatic global threshold calculation approaches that can be used in this system [2]:

Algorithm of Ridler and Calvard, which optimizes the process of changing a gray-level image to a bimodal image, while retaining the best possible illumination of the image.

Algorithm of Otsu, which is a classical algorithm in image binarization. This algorithm transforms a gray-level image to a binary image for classifying foreground and background with a global threshold. This algorithm can be applied iteratively to a gray-scale histogram of an image for generating threshold candidates.

Algorithm of Pun proposes an optimal criterion for image thresholding. This criterion is corrected and improved by Kapur et al. which revised and improved Pun's algorithm by assuming two probability distributions for objects and background as well as maximizing the entropy of the image to obtain the optimal threshold.

Algorithm of Kittler and Illingworth, proposing a minimum error thresholding algorithm that minimizes the probability of classification error by fitting error expression. It is assumed that a mixture of two Gaussians distributions of object and background pixels can characterize the image.

Algorithm of Fan et al., proposing a fast entropic technique to obtain a global threshold automatically by reducing complexity in computation.

Algorithm of Portes de Albuquerque et al. proposing an entropic thresholding algorithm, which is customized from non-extensive Tsallis entropy concept.

Algorithm of Xiao et al. proposing an entropic thresholding algorithm based on the gray-level spatial correlation (GLSC) histogram. This is a revision and extension of Kapur et al.'s algorithm.

In one exemplary embodiment, the algorithm of Kapur has been selected for implementation [3]. This algorithm assumes two probability distributions, for objects $p_{obj}$ (foreground) and background $p_{bg}$, and maximizes the between-class entropy of the image to obtain the optimal threshold.

The between-class entropy of the threshold image is defined as:

$$f_1(TH) = H(0, TH) + H(TH, L) \quad (2)$$

where $$H(0, TH) = -\sum\nolimits_{i=1}^{TH} \frac{p_i}{p_{obj}} \ln \frac{p_i}{p_{obj}} \quad (3)$$

$$H(TH, L) = -\sum\nolimits_{i=TH+1}^{L} \frac{p_i}{p_{bg}} \ln \frac{p_i}{p_{bg}} \quad (4)$$

and $$p_{obj} = -\sum\nolimits_{i=0}^{TH} p_i \quad (5)$$

$$p_{bg} = 1 - p_{obj} \quad (6)$$

$p_i$ is the probability of a pixel value to appear in the current image and is defined as the ratio of the appearances of a value to the total number of pixels.

For bi-level thresholding, the optimal threshold is:

$$TH_{optimal} = \text{ArgMax}\{f_1(TH)\} \quad (7)$$

In other words the optimal threshold value is the value of TH for which the quantity $f_1$ is maximized for each frame.

Threshold Input Unit (231 in FIG. 2)

This unit is an input unit, which can be used optionally to input a threshold value manually.

Morphological Filtering Unit (225 in FIG. 2)

In the presence of electronic noise, or physical obstacles (e.g. dust) the binarization process may result in binary noise. Binary noise manifests as white spots. These spots can cause a significant increase of the processing time. This is because the Connected Component Analysis unit (232 in FIG. 2) separately analyzes each non-black pixel to see if it is physically connected to any other pixel.

To overcome this problem, the Morphological Filtering unit cleans any isolated pixels in order to eliminate these pixels and to produce a more "clear" binary image.

Figure 8:
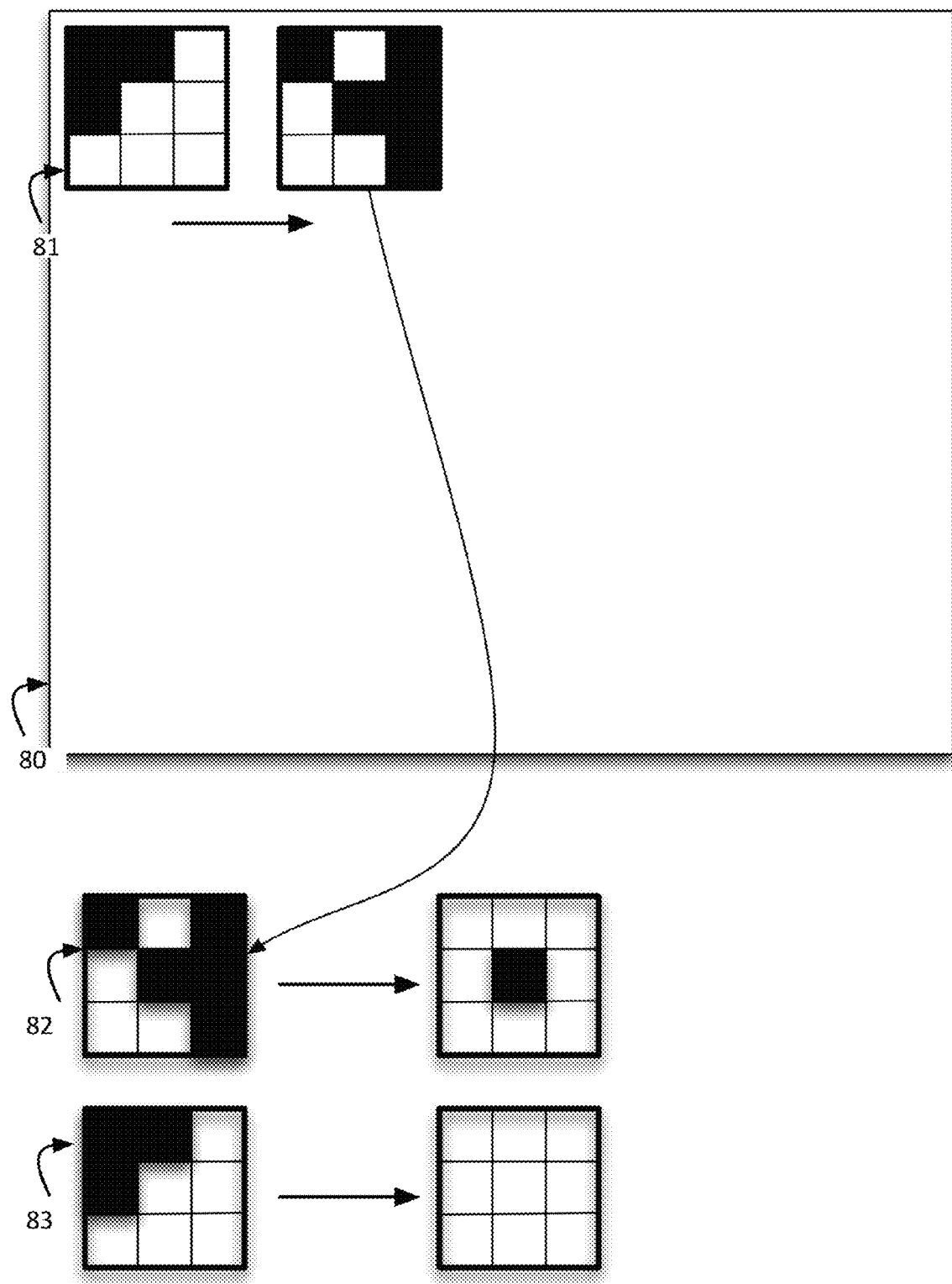
FIG. 8 illustrates an exemplary morphological operation.

The unit implements the following morphological operation: In each video frame (80 in FIG. 8) a 3×3 mask is formed (81 in FIG. 8) and starts rolling from the first pixel within a binary image from position (0,0) towards higher x and y coordinates.

For each window the number of black $N_b$ and the number of white pixels $N_w$ is counted. Then if $N_b > N_w$ the central pixel of the 3×3 window is set to have black value (82 in FIG. 8) else the central pixel of the 3×3 window is set to have white value (83 in FIG. 8).

Connected Component Analysis Unit (226 in FIG. 2)

This unit aims at the labeling of the binary image regions using a connected components algorithm. The target is to label each object within the binary image and this incorporates the labeling of each pixel with a label. Pixels that are somehow connected are given the same label. At the end of this procedure, pixels with the same label corresponding to an object, having the same label as its constituting (labeled) pixels.

In an exemplary embodiment, a run-length based connect component algorithm is used [4], which is similar to the two-pass connected component algorithm [5], but here run-lengths are used rather than pixels resulting in a more efficient implementation in terms of computer memory and processing power.

The stages involved in this implementation are as follows:
1. Encoding pixels to runs (using run-length encoding);
2. Initial labeling and propagation of labels
3. Resolving of conflicts; and
4. Translating run labels to connected component.

Encoding Pixels to Runs (Using Run-Length Encoding),

In accordance with an exemplary embodiment of the current invention, a run-length encoding representation is followed for labeling. The run-length encoded format is also much more compact than a binary image (individual runs have a single label), and so the sequential label propagation stage that follows, is much faster than the conventional algorithm.

Figure 9:
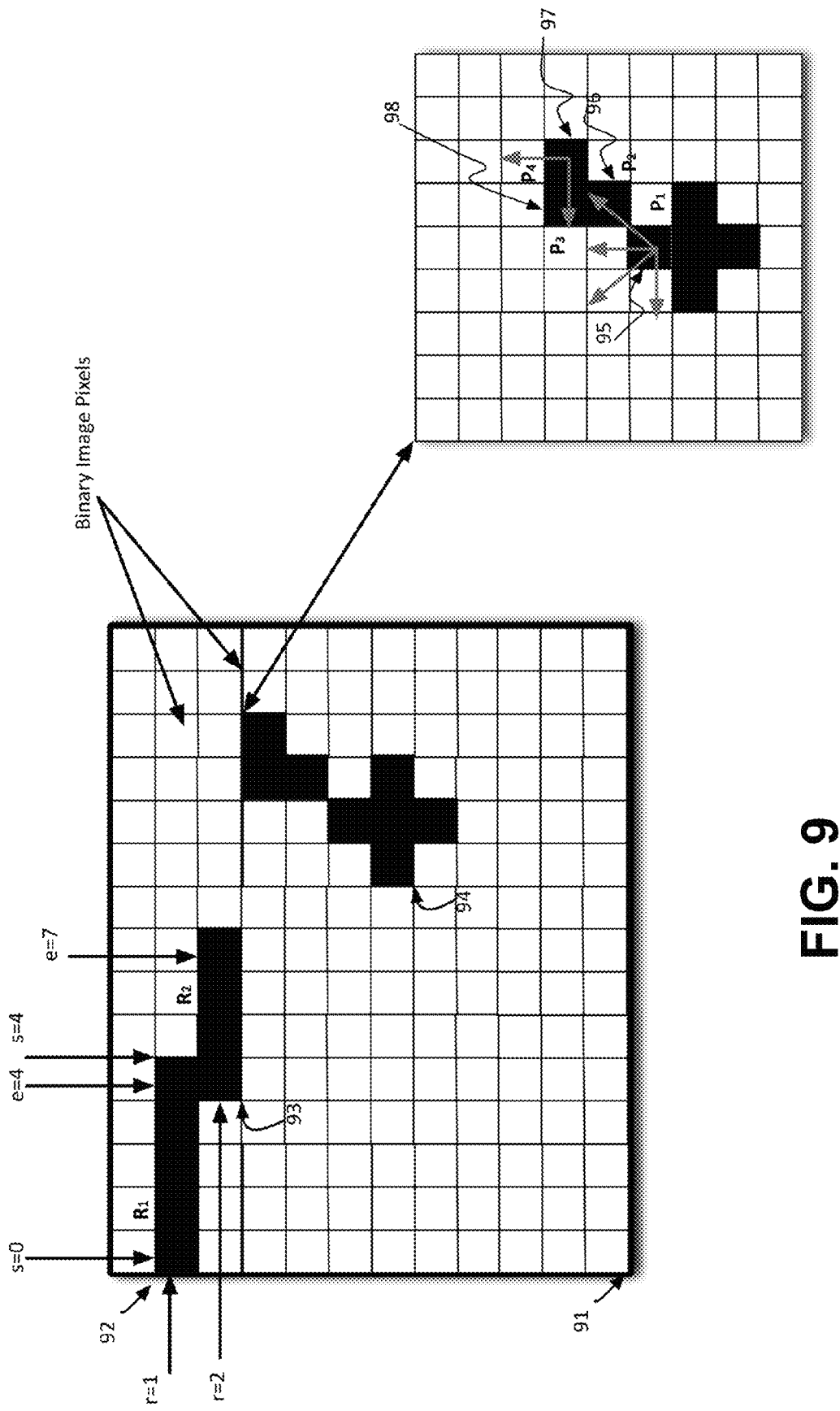
FIG. 9 illustrates an exemplary run-length encoding technique.
Figure 10:
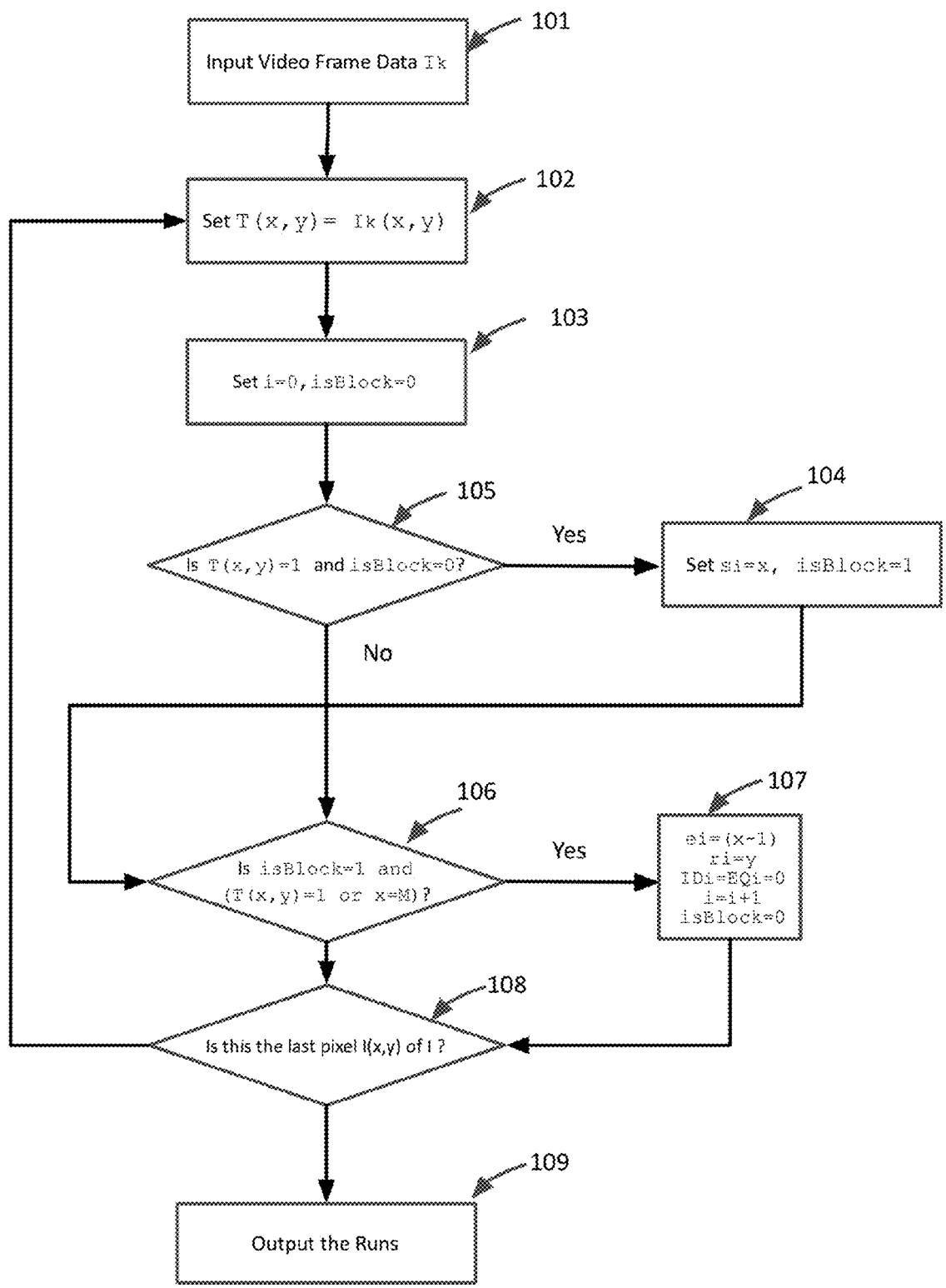
FIG. 10 is a flowchart illustrating an exemplary run-length encoding technique.

Run-length encoding works as follows: Consider the binary image frame (91 in FIG. 9). The target is to encode the contiguous foreground pixels (black colored), which, when working in rows, they are nothing else but black lines. For each line the starting pixel x-coordinate s, the end pixel coordinate e and the row r of that the line is recorded. For example line $L_1$ in FIG. 9 (92 in FIG. 9) starts at the first pixel of that row, so s=0, ends at the 5-th pixel of that row (thus e=4) and lies at the second row (thus r=1). Therefore this line is encoded as (0,4,1) and this code is also called a Run. The same procedure is followed for every line in the image. A run is complete when the end of a row is reached or when a background pixel is reached. The maximum possible number of runs in an image of size M×N is 2MN and the flow of the related algorithm is shown in FIG. 10.

Initial Labeling and Propagation of Labels

Figure 11:
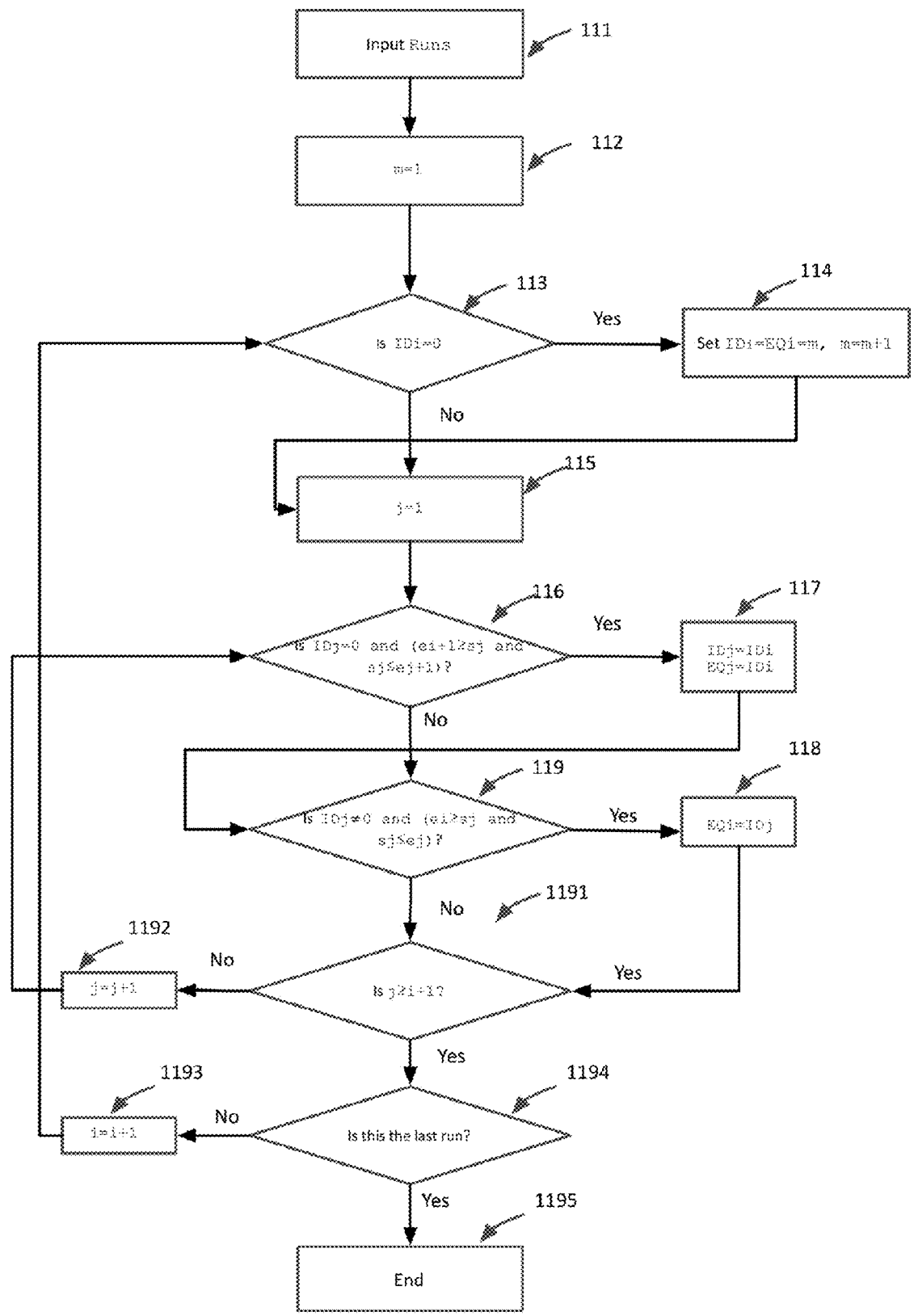
FIG. 11 illustrates an exemplary technique for the initial labeling and propagation of labels.

This stage involves initial labeling and propagation of labels (FIG. 11). The IDs and equivalences (EQs) of all runs are initialized to zero. This is followed by a raster scan of the runs; assigning provisional labels, which propagate to any adjacent, runs on the row below. For any unassigned run (IDi=0) a unique value is assigned to both its ID and EQ.

After that, the 4-way or 8-way connectivity is checked of each run. In 4-way connectivity, the adjacent pixels in four directions (up, down, left, right) are checked. If they are foreground pixels then are connected otherwise they are un-connected. Consider for example pixels P$_3$ (98 in FIG. 9) and P$_4$ (97 in FIG. 9). These are 4-way connected since pixel P$_3$ is on the left of pixel P$_4$.

In 8-way connectivity, the diagonal directions are also checked. Consider for example pixels P$_1$ (95 in FIG. 9) and P$_2$ (96 in FIG. 9), which are not 4-way connected to each other. However P$_2$ is in the diagonal direction of P$_1$, so P$_1$ and P$_2$ are 8-way connected.

For each Run with identity ID$_i$ excluding Runs on the last row of the image, Runs R$_j$ one row below the R$_i$ is checked for a connection. In terms of run-length encoded lines, 4-way connection between two Runs R$_i$,R$_j$ means that the following conditions hold:

$$s_i \le e_j \quad (8)$$

and $$e_i \ge s_j \quad (9)$$

8-way connection between two Runs R$_i$, R$_j$ means that the following conditions hold:

$$s_i \le e_j + 1 \quad (10)$$

and $$e_i + 1 \ge s_j \quad (11)$$

a connected run in the row below r$_i$, is assigned the identity ID$_i$, if and only if its ID, ID$_j$ is unassigned. If there is a conflict (e.g. if an overlapping run has assigned ID$_j$), the equivalence of run I (the EQ$_i$) is set to IDj.

Resolving of Conflicts

Figure 12:
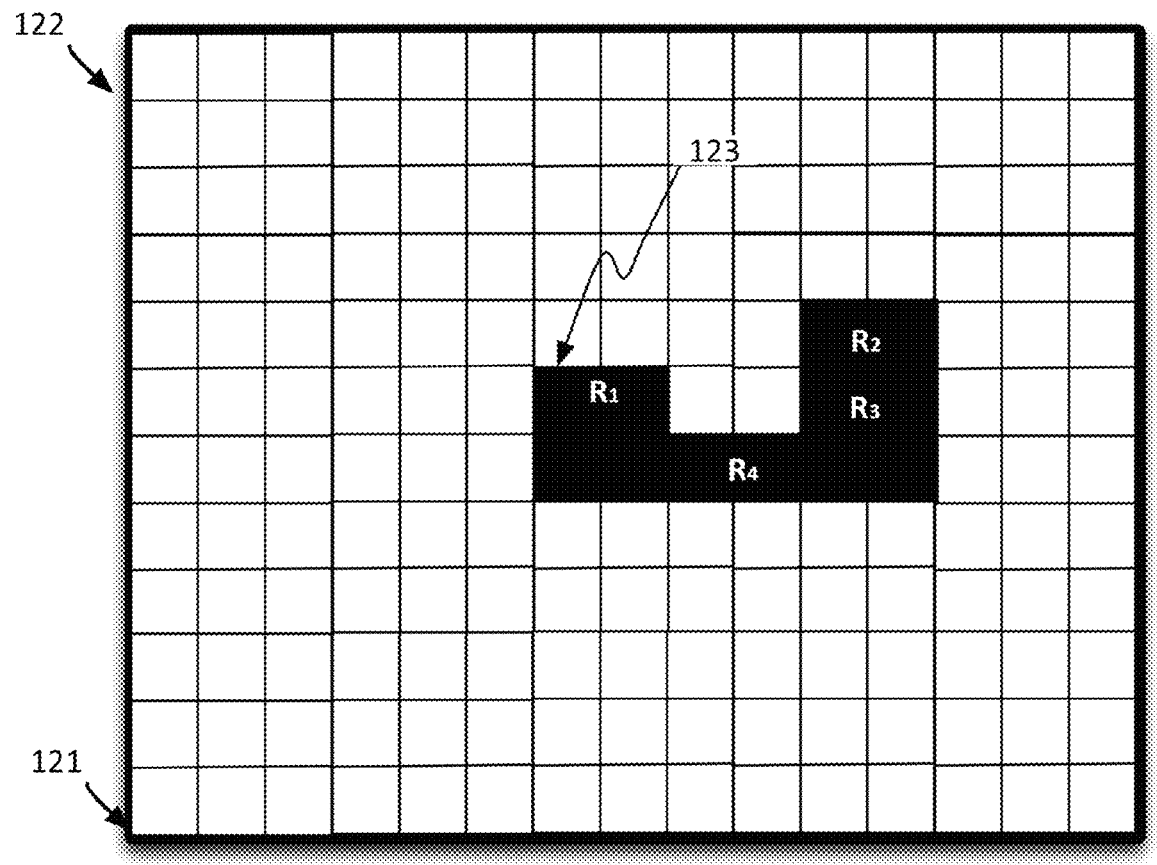
FIG. 12 illustrates an exemplary application of a labeling algorithm.
Figure 13:
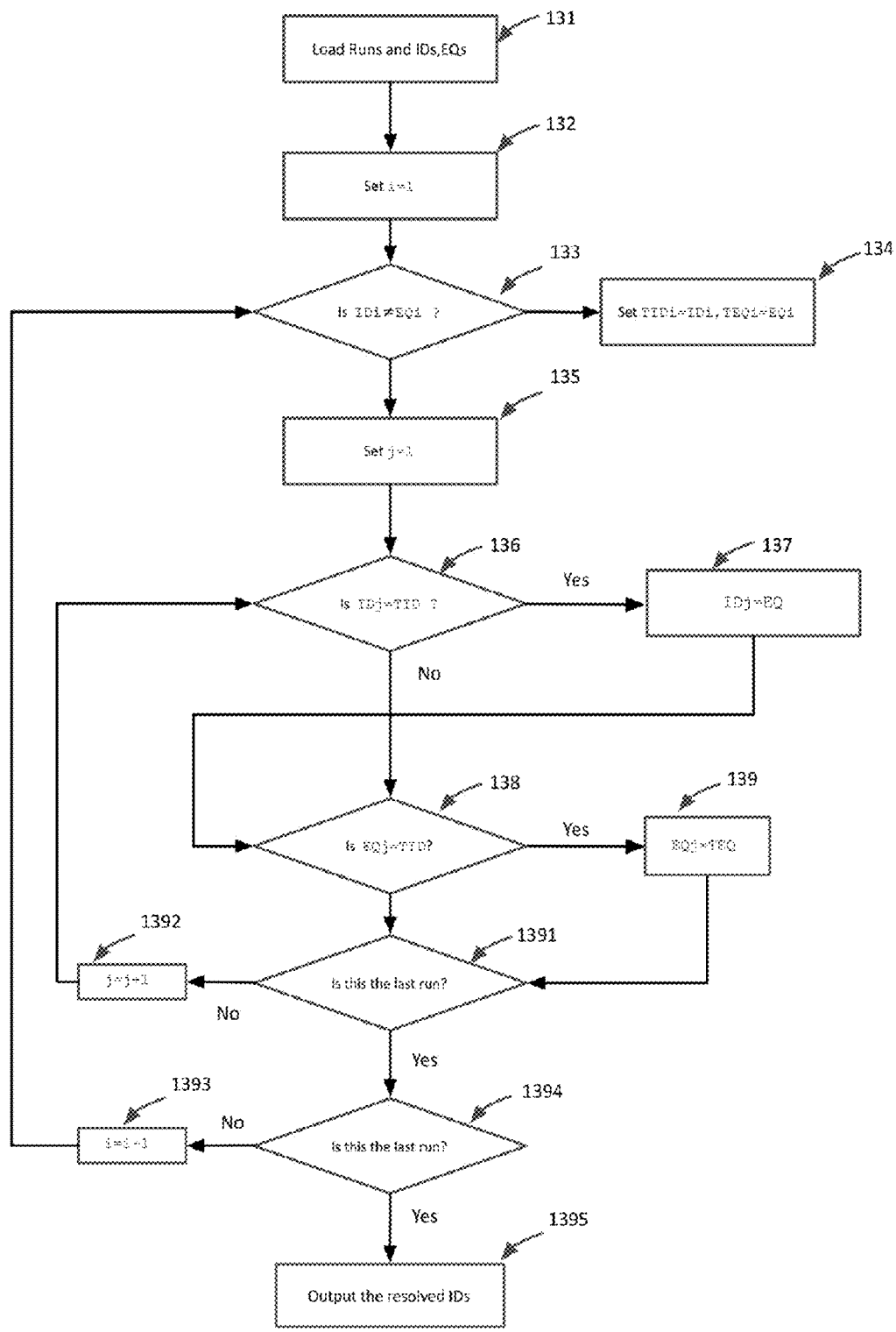
FIG. 13 is a flowchart illustrating an exemplary conflict-resolving algorithm.

The EQ and ID values should be equal. A differentiation between those two values for some run indicates the presence of some conflict, which occasionally happens when special shaped objects are encountered. Thus a third stage must be included for resolving those conflicts. For example this problem may be occurred when a 'U'-shaped object is encountered. As shown in FIG. 12, applying labeling algorithm to the 'U'-shaped object (123 in FIG. 12) will generate four runs R$_1$, R$_2$, R$_3$, R$_4$, each with unassigned ID and The solution is a conflict-resolving algorithm, which follows a serial procedure, which scans all the runs sequentially, in the way shown in FIG. 13.

Translating Run Labels to Connected Component.

At the end of this procedure, each run has a label; so it is straightforward to obtain the final components, by simply gather the runs having the same labels.

Region Classification Unit (228 in FIG. 2)

The aim of this unit is to classify each region identified with the help of the CCA unit (227 in FIG. 2) and stored to the CCA data memory (25 in FIG. 2), in order to classify this region as a car-plate or not. To this end, several characteristic features of each region are measured. These features are forming then a vector characterizing this region and then are classified.

The region classification procedure includes two steps: The region feature extraction and the region classification.

Region Feature Extraction

Figure 14:
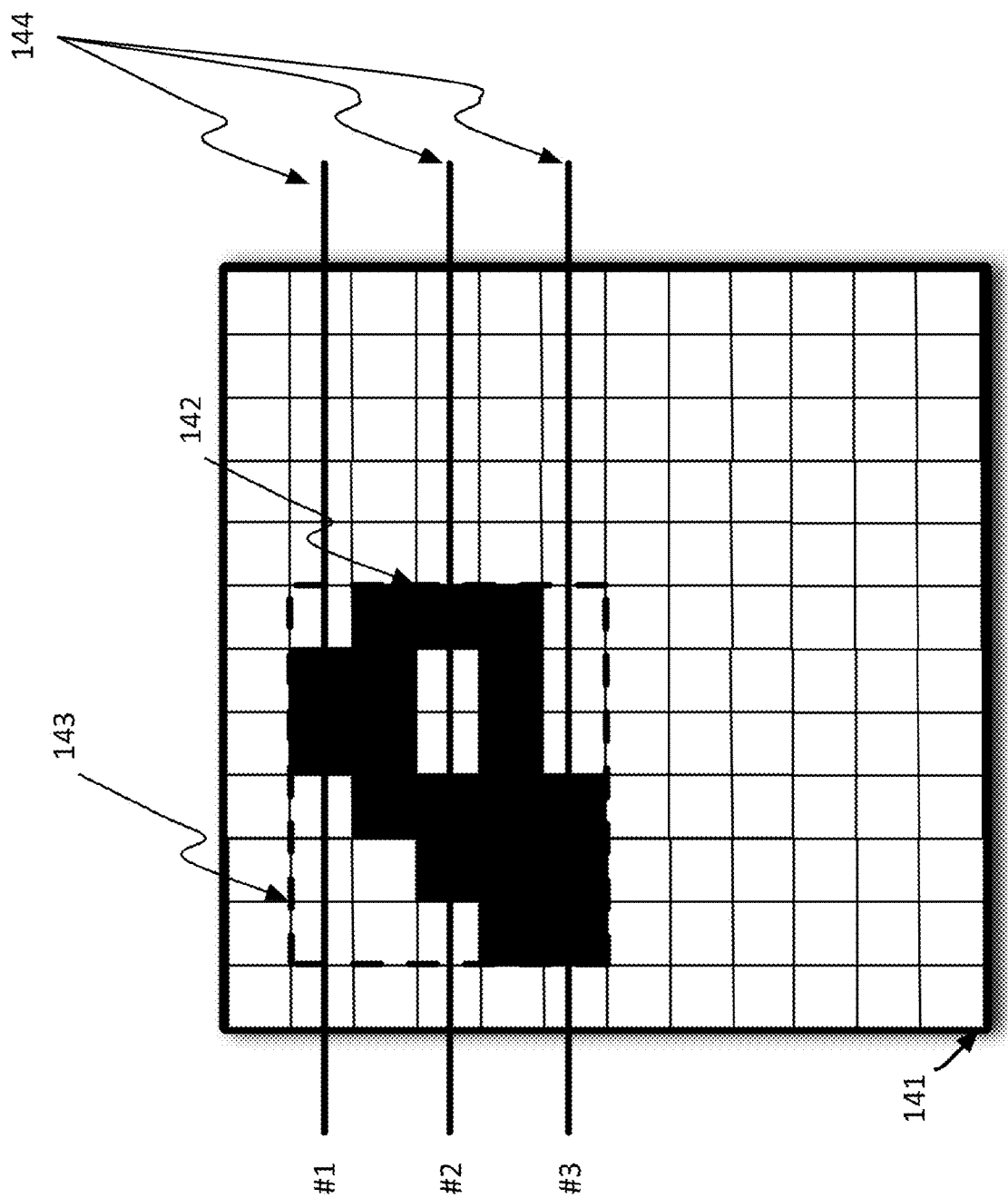
FIG. 14 illustrates an exemplary region feature extraction technique.

Region feature extraction includes the measurement of several characteristic features of each region (142 in FIG. 14). The features that are measured are the following:

The width of the region: Width corresponds to the width of a rectangle surrounding the region under consideration (144 in FIG. 14). The width of the rectangle is computed as the difference of the maximum x coordinate minus the minimum x coordinate.

The area that the region occupies: This is the area occupied by a rectangle surrounding the region under consideration (144 in FIG. 14) measured in square pixels. The width of the rectangle is computed as the difference of the maximum x coordinate minus the minimum x coordinate, and the height of the rectangle is computed as the difference of the maximum y coordinate minus the minimum y coordinate. The area equals the product of width by the height of the rectangle.

The magnitude of the region: This is the count of the non-white pixels N$_{NW}$, of the connected region and is measured in pixels.

The plenitude of a region: This measure indicates how full the region under consideration is. For example a region containing gaps will have less plenitude in relation with a region not having gaps. The plenitude of a region is defined as the ratio of the area to the magnitude features defined above.

The aspect ratio of a rectangle surrounding the region under consideration (143 in FIG. 14): The region under test is surrounded by a rectangle. The ratio of this rectangles height to the rectangles width gives the aspect ratio of that region.

Number of Scan-lines intersection points: Several "virtual" lines of 1-pixel thickness are considered that intersect the region at different heights (144 in FIG. 14). The system records the number of pixels that each scan line meets in each track throughout the region and produces a feature vector FV$_{SL}$ of cardinality N$_{SL}$, where N$_{SL}$ is equal to the number of the scan lines and contains the ID of each scan-line and the number of pixels that this line intersects. As an example, consider the scan lines indicated in FIG. 14, (144 in FIG. 14). Since the first line intersects with 2 pixels, the second line with 3 pixels and the third line with three pixels, then this future vector is FV$_{SL}$={1, 2, 2, 3, 3, 3}.

Statistical normalized central moments (Hu Moments). Statistical manipulation of the pixels and their coordinates within a region result in the formation of a set of region-specific features called statistical moments [6]. Central moments are given by the following expression:

$$\mu_{pq} = \Sigma_x \Sigma_y (x-\bar{x})^p (y-\bar{y})^q \quad (12)$$

In Eq. (12) x, y are the x and y coordinates of each pixel in the region and $\bar{x}$, $\bar{y}$ are the mean values of all x and all y coordinates respectively for each non-white pixel within this region. Integer numbers p and q, determine the order of a statistical moment. Combinations of low order statistical moments (up to the order of 2 e.g. $\mu_{02}$ to $\mu_{11}$), represent some physical measure of the region as the mean, the mass-center, the skewness, the angle with the x-axis etc. For example, the angle of a region with the horizontal x-axis is given by the following expression:

$$\theta = \arctan\left(\frac{2m_{11}}{m_{20} - m_{02}}\right) \quad (13)$$

In an exemplary embodiment, the calculation of these statistical moments is performed in the encoded space and on the run-length encoded runs. As it has been described above, each run is described by three numbers namely s$_i$, e$_i$, r$_i$, which indicate the start and the end on the x-direction as well as the row of each non-white pixel within the region under consideration. If this type of description is used, eq. 12 cannot be directly applied, since the coordinates of each pixel in the region under consideration is not available. To this end eqn. 12 should be modified accordingly. Below, this modification of the central moments is given for order up to 3 ($p+q\leq 3$).

$$\mu_{11} = \frac{1}{N_{NW}}\Sigma_i r_i\left(\frac{s_i + e_i}{2}\right)(e_i - s_i + 1) - \bar{y} \quad (14)$$

$$\mu_{20} = \frac{1}{N_{NW}}\Sigma_i\left(\frac{e_i - s_i + 1}{6}\right)[(e_i + s_i)^2 + e_i(e_i + 1) + s_i(s_i - 1)] - \bar{x}^2 \quad (15)$$

$$\mu_{02} = \frac{1}{N_{NW}}\Sigma_i r_i^2(e_i - s_i + 1) - \bar{y}^2 \quad (16)$$

$$\mu_{12} = \frac{1}{N_{NW}}\Sigma_i r_i^2\left(\frac{s_i + e_i}{2}\right)(e_i - s_i + 1) - 2\bar{y}\mu_{11} - \bar{x}\mu_{02} + \overline{xy}^2 \quad (17)$$

$$\mu_{21} = \frac{1}{N_{NW}}\Sigma_i r_i\left(\frac{e_i - s_i + 1}{6}\right)[(e_i + s_i)^2 + e_i(e_i + 1) + s_i(s_i - 1)] - \bar{y}\mu_{20} - 2\bar{x}\mu_{11} - \bar{x}^2\bar{y} \quad (18)$$

$$\mu_{03} = \frac{1}{N_{NW}}\Sigma_i r_i^3(e_i - s_i + 1) - 3\bar{y}\mu_{02} - \bar{y}^3 \quad (19)$$

$$\mu_{30} = \quad (20)$$
$$\frac{1}{N_{NW}}\Sigma_i\left(\frac{e_i - s_i + 1}{4}\right)[e_i^3 - 2s_i^3 + s_i^2(e_i - 1) + e_i(s_i + 1)] - 3\bar{x}\mu_{20} - \bar{x}^3,$$

where $$\bar{x} = \frac{1}{N_{NW}}\Sigma_i r_i\left(\frac{s_i + e_i}{2}\right)(e_i - s_i + 1) \quad (21)$$

$$\bar{y} = \frac{1}{N_{NW}}\Sigma_i r_i(e_i - s_i + 1) \quad (22)$$

One interesting modification of these moments, results when the central moments are normalized used following relation:

$$n_{pq} = \frac{\mu_{pq}}{\mu_{00}^\gamma}, \text{ where } \gamma = \frac{p+q}{2} + 1 \quad (23)$$

By using these normalized central moments, a new set of statistical moments can be formed, known as the Hu moments $I_i$, given by the following relations $$I_1 = n_{20} + n_{02} \quad (24)$$

$$I_2 = (n_{20} - n_{02})^2 + 4n_{11}^2 \quad (25)$$

$$I_3 = (n_{30} - 3n_{12})^2 + (3n_{21} - n_{03})^2 \quad (26)$$

$$I_4 = (n_{30} + n_{12})^2 + (n_{21} + n_{03})^2 \quad (27)$$

$$I_5 = (n_{30} - 3n_{12})(n_{30} + n_{12})[(n_{30} + n_{12})^2 - 3(n_{21} + n_{03})^2] + (3n_{21} - n_{03})(n_{21} + n_{03})[3(n_{30} + n_{12})^2 - (n_{21} + n_{03})^2] \quad (28)$$

$$I_6 = (n_{20} - n_{02})[(n_{30} + n_{12})^2 - (n_{21} + n_{03})^2] + 4n_{11}(n_{30} + n_{12})(n_{21} + n_{03}) \quad (29)$$

$$I_7 = (3n_{21} - n_{03})(n_{30} + n_{12})[(n_{30} + n_{12})^2 - 3(n_{30} + n_{03})^2] - (n_{30} - 3n_{12})(n_{21} + n_{03})[3(n_{30} + n_{12})^2 - (n_{21} + n_{03})^2] \quad (30)$$

In a different implementation the run-length encoded region under consideration, is first decoded in order to obtain the initial binary image corresponding to this region. In this case, equation 12 is applied directly. The procedure that is followed in order to do this is analyzed below, in the description of the digit segmentation unit.

The feature vector $FV_{HM} = \{I_2, I_3, I_4, I_5, I_6, I_7\}$ resulting from this set of features contains up to 7 numbers corresponding to the 7 Hu moments $I_1$ to $I_7$ as described in Eqs. 24-30.

Region Classification

The region classification aims to the classification of each region under consideration as a car-plate or not, using also input from the Classification Criteria Trimming unit (227 in FIG. 2).

In implementing an exemplary embodiment, a pattern classification scheme is used for region classification. To this end, the system has been previously trained offline, using a database with regions corresponding to plates and with regions corresponding to non-plates. For each region, the features described in the previous section are evaluated and a total feature vector is formed. The feature vector is then projected in the feature space, defined as a multi-dimensional space with as many dimensions as the feature vector. In such a projection, the feature vectors corresponding to plate and non-plate regions are concentrated (clustered) in separate areas of the multi-dimensional feature space. Consider the example shown in FIG. 15 incorporating a 3-dimensional feature vector $FV = \{FV_1, FV_2, FV_3\}$, which builds a 3 dimensional feature space (151 in FIG. 15). Each point in this space is defined by the three coordinates $FV_1, FV_2, FV_3$. The projection of the several regions on this axis-system creates two clusters one for the regions corresponding to plates (153 in FIG. 15) and one for the regions not corresponding to plates (152 in FIG. 15).

The next step is to define the centers of the individual clusters. In accordance with one exemplary embodiment, this is achieved via the calculation of the center of mass of each cluster. The center of mass has coordinates $\overline{FV}_C = \{\overline{FV}_1, \overline{FV}_2, \ldots, \overline{FV}_D\}$ where D is the dimensionality of the feature space, and each coordinate $\overline{FV}_k$ is defined as:

$$\overline{FV}_k = \frac{1}{N_{NS}}\Sigma_i FV_{ki} \quad (31)$$

where $N_s$ is the number of samples (regions) participating in each cluster. In the 3-dimensional example referred before, the centers of the clusters are indicated as C1 (156 in FIG. 15) and C2 (157 in FIG. 15).

When a new region T is tested, its feature vector $FV_T$ is obtained. This corresponds to a point in the feature space. In order to test into which cluster this test point belongs, the distance of this point from the centers of the clusters is computed using some distance measure such as the L1 distance, L2 distance, the Mahalanobis distance etc.

In one exemplary embodiment, the L2 distance is used which is defined as follows: in Cartesian coordinates, if $p = (p_1, p_2, \ldots, p_n)$ and $q = (q_1, q_2, \ldots, q_n)$ are two points in Euclidean n-space, then the L2 or Euclidean distance from p to q, or from q to p is given by the following expression:

$$d(p,q) = d(q,p) = \sqrt{\Sigma_{i=1}^n (q_i - p_i)^2} \quad (32)$$

Figure 15:
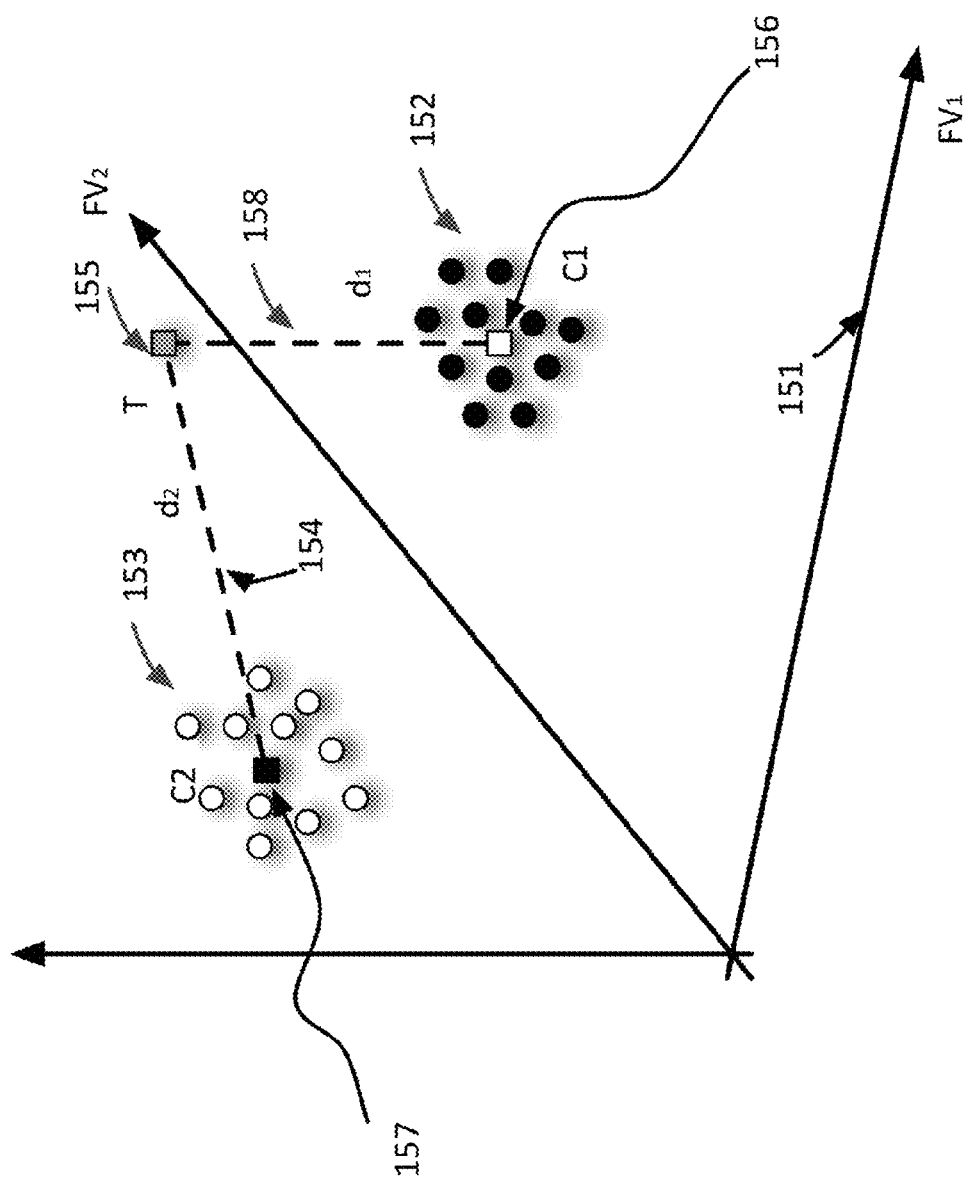
FIG. 15 illustrates an exemplary pattern classification scheme is used for region classification.

In the 3-dimensional example of FIG. 15, the distance of the test point T (155 in FIG. 15) from the cluster-center C1 (152 in FIG. 15) is d1 (158 in FIG. 15) and from the cluster-center C2 (157 in FIG. 15) is d2 (154 in FIG. 15).

Once the distances of the test point from the centers of the clusters are computed, the decision about into which cluster this point belongs to is taken according a proximity criterion. That is, the point belongs to the nearest cluster according to the distance measure used. Once this decision has been made, the region under test has been classified as plate or non-plate.

While the above description utilizes a specific classifier, it is understood that an Artificial Neural Network classifier or any other type of classifier can be used.

An alternative to pattern classification, is the feature filtering implementation. In this scheme, a region can be classified as plate or non-plate according to some empirical measures corresponding to physical properties of each region, or some empirical observations.

To this end the features of width, magnitude, aspect ratio, plenitude, scan-lines and the angle with the x-axis (eq. 13) are used. The target is a formation of a decision vector as follows:

Each of the above-mentioned features is checked against a target value or a range of target values rule (TABLE 1), which are in turn obtained from empirical observations or from governmental standards. These rules are input from the Classification Criteria Trimming unit (227 in FIG. 2).

Conformance to the target value corresponds to a true indication and a non-conformance to the target value corresponds to a false indication. To this end a binary decision vector DV is obtained as follows:

$$DV=\{D_{width\_rule}, D_{magnitude\_rule}, D_{aspect\_ratio\_rule}, D_{plenitude\_rule}, D_{scan-lines\_rule}, D_{angle\_rule}\}$$

TABLE 1

| Feature | Target Value Rule (example) |
| --- | --- |
| Width | >100 AND <300 |
| Magnitude | >1000 AND <5000 |
| Aspect ratio | >3 AND <5 |
| Plenitude | >0.5 AND <0.9 |
| Scan-lines | >5 AND <12 |
| Angle | <5 |

A simple approach is to classify the region as a plate if and only if all the logic vector containing logic ones, meaning that the all the feature values conforming to the target values.

However in the current implementation a decision fusion rule is formed leading to optimal results. This fusion rule is the following $$FR=\{[D_{width\_rule} \text{ AND } D_{aspect\_ratio\_rule} \text{ AND } D_{angle\_rule}] \text{OR} [D_{plenitude\_rule} \text{ AND } D_{scan-lines\_rule}]\}$$

If FR is TRUE then the region is classified as a plate, while if FR is FALSE the region is classified as a non-plate.

The target value rules can be change when is needed (e.g. the system need to be trimmed for a different country) through the Classification Criteria Trimming unit (227 in FIG. 2).

Classification Criteria Trimming Unit (227 in FIG. 2)

This unit is used for input target value rules to the region classification unit (228 in FIG. 2)

Plate Output Unit (234 in FIG. 2)

The aim of this unit is to output the coordinates of each region classified as a car plate. The unit outputs the plate if and only if the Automatic Threshold Adaptation unit (223 in FIG. 2), indicate that the right number of digits have been detected.

Digit Segmentation Unit (229 in FIG. 2)

The aim of this unit is to segment the individual digits constituting a car-plate in order to be able to be output from the system in binary form to an Optical Character Recognition (OCR) system.

Figure 16:
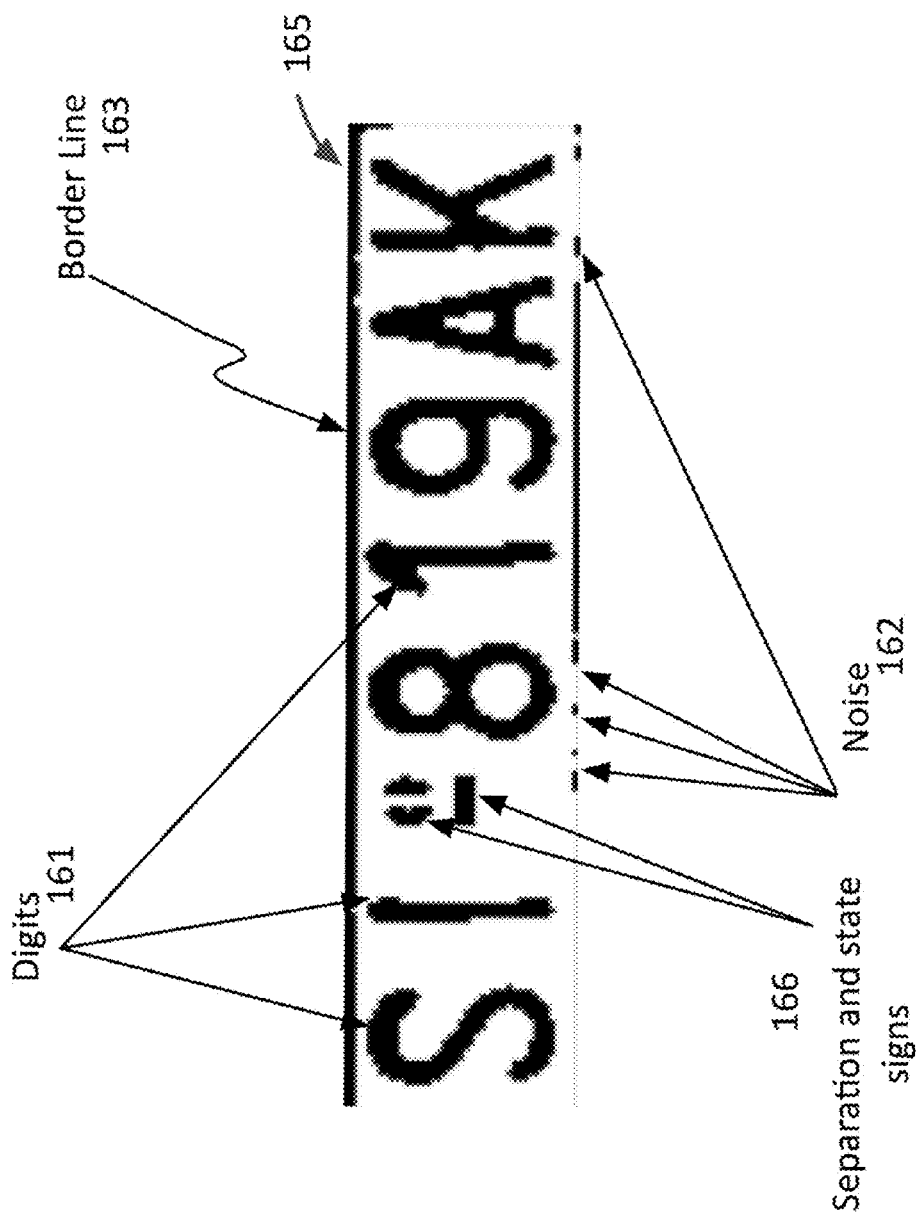
FIG. 16 illustrates how digits in a binary plate image appear as coherent regions.

The digits in a binary plate image appear as coherent regions (161 in FIG. 16). Therefore the unit performs a CCA analysis similar with the analysis performed in CCA unit (226 in FIG. 2). However on top of the plate digits, the plate image usually contains additional regions corresponding to e.g. the plate border-line (163 in FIG. 16), separation and state signs (166 in FIG. 16), noise (162 in FIG. 16) etc. To this end an additional filtering scheme is applied in order to filter-out any regions not corresponding to digits. This filtering scheme includes the computation of a simple feature and checking this feature against a target value rule.

Figure 17:
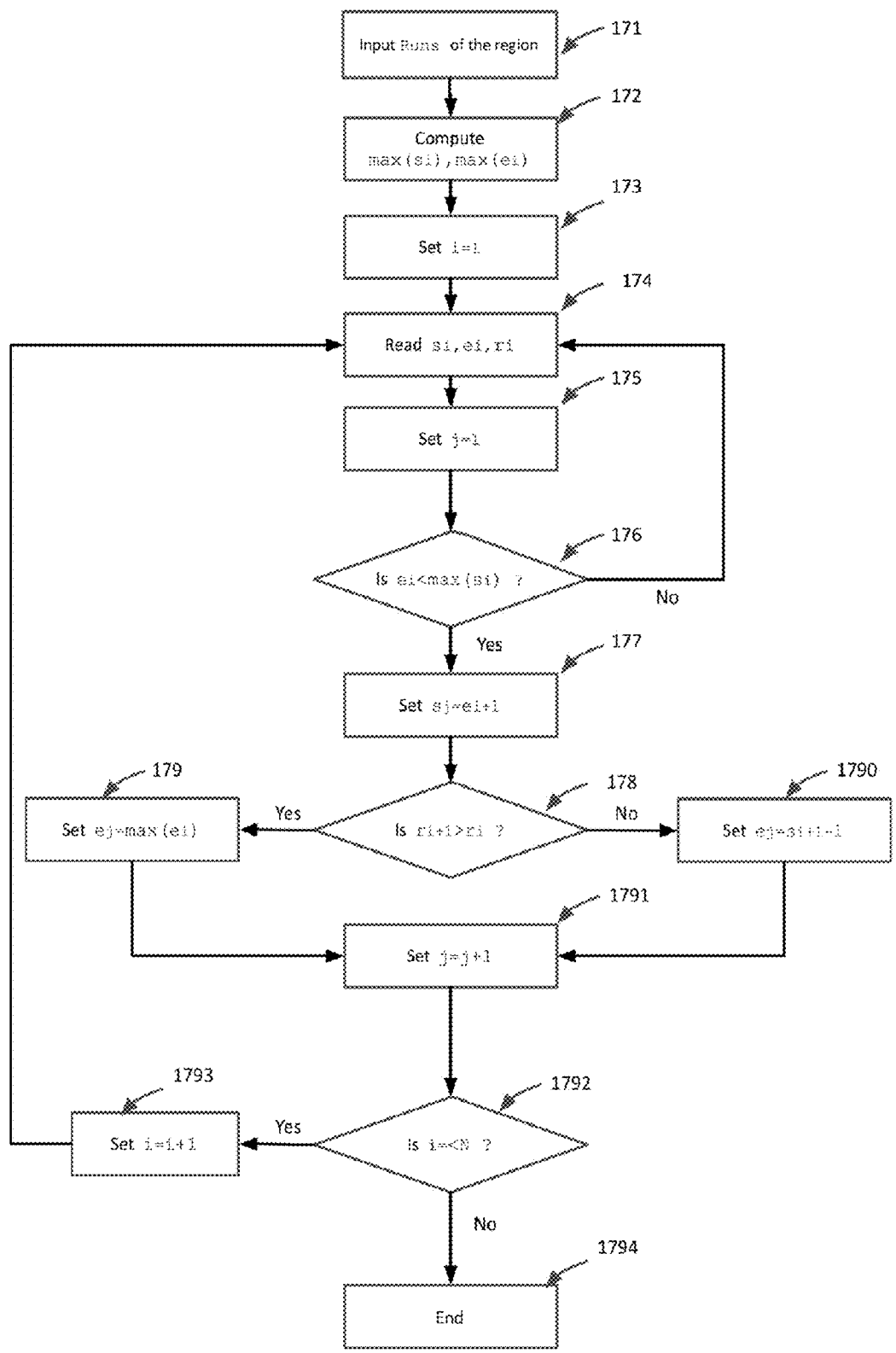
FIG. 17 is a flowchart illustrating an exemplary technique for a background-foreground inversion for the regions detected as plates.

The CCA analysis performed in this unit follows steps 2 and 3 of the CCA analysis performing the CCA unit, leaded by an extra step, which is the background-foreground inversion. In the first CCA analysis, the digits of the plate appear as white holes (background), since the digits are usually black. To this end they are not run-length encoded and thus information about them cannot be extracted. To this end a background-foreground inversion must be carried out for the regions detected as plates using a procedure, which for a region containing N runs is shown in FIG. 17.

Figure 18:
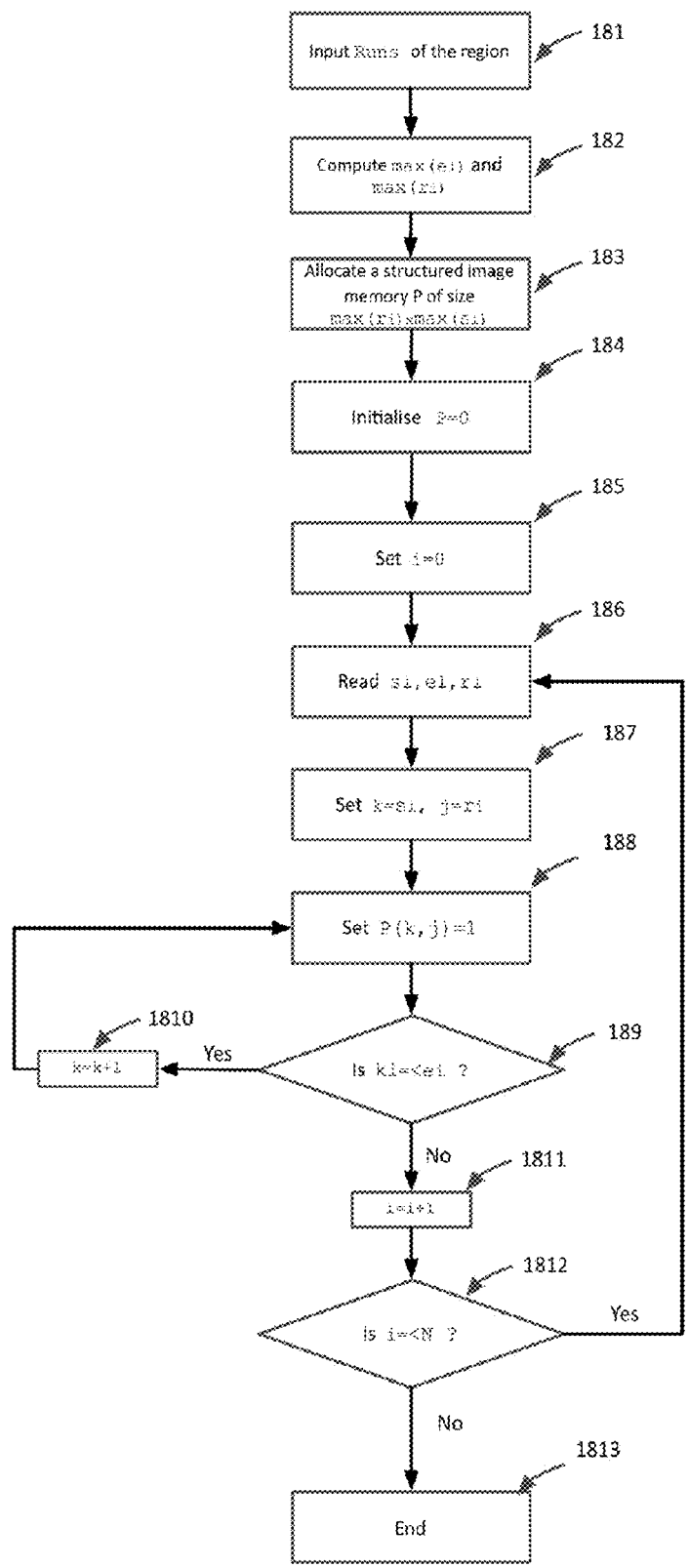
FIG. 18 is a flowchart illustrating an exemplary technique for new inverted runs being de-coded in binary image format.

Once the background-foreground inversion has been carried out, the new inverted runs must be de-coded in binary image format (pixels coordinates and values). This process is straightforward and incorporates the use of a structured image memory, which is loaded with pixels values at coordinates indicated by the run-length code. Analytically the process followed in the current implementation for a region containing N runs, is shown in FIG. 18.

Digit Output Unit (230 in FIG. 2)

The aim of this unit is to output the digits to the system output when the Automatic Threshold Adaptation unit (223 in FIG. 2) indicates that the right number of digits has been detected.

The systems, methods and techniques described herein performed or implemented on any device that comprises at least one camera, including but not limited to, standalone cameras, security cameras, smart cameras, industrial cameras, mobile phones, tablet computers, laptop computers smart TV sets and car boxes, i.e. a device embedded or installed in an automobile that collects video and images. It will be understood and is appreciated by persons skilled in the art, that one or more processes, sub-processes or process steps described in embodiments of the present invention can be implemented in hardware and/or software.

While the above-described flowcharts and methods have been discussed in relation to a particular sequence of events, it should be appreciated that changes to this sequence can occur without materially effecting the operation of the invention. Additionally, the exemplary techniques illustrated herein are not limited to the specifically illustrated embodiments but can also be utilized and combined with the other exemplary embodiments and each described feature is individually and separately claimable.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing (or configurable to implement) a state machine that is in turn capable of implementing (or configurable to implement) the methodology illustrated herein can be used to implement the various methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the video processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA™ or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

It is therefore apparent that there has been provided, in accordance with the present invention, systems and methods for the detection of multiple number-plates of moving vehicles. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

REFERENCES (All of which are incorporated herein by reference in their entirety)
1. Sobel operator, Wikipedia, http://en.wikipedia.org/wiki/Sobel_operator
2. M. Athimethphat, "*A Review on Global Binarization Algorithms for Degraded Document Images*", AU J. T. 14(3): 188-195 (January 2011).
3. J. N. Kapur et all. "*A new method for gray-level picture thresholding using the entropy of the histogram*", Computer Vision, Graphics and Image Processing, 29, 273-285, 1985.
4. Kofi Appiaha, Andrew Huntera, Hongying Menga, Patrick Dickinson, "*Accelerated hardware object extraction and labeling: from object segmentation to connected components labeling*", Preprint submitted to Computer Vision and Image Understanding Aug. 22, 2009
5. N. Ma, D. G. Bailey, and C. T. Johnston, "*Optimized single pass connected components analysis*" IEEE International Conference on Field-Programmable Technology, 2008.
6. R. C. Gonzalez, R. E. Woods, "*Digital Image Processing*", pages: 514-516, Addison-Wesley, 1993.

What is claimed is:

1. A system comprising:
a storage system; and
a car-plate detection system that identifies car plates from one or more images captured by a camera, and utilizes region classification to determine whether a region within the one or more images is a car plate or is not a car plate, wherein the region classification is based upon pattern recognition using normalized central Hu moments determined in the run-length encoded domain where a feature vector comprised of each Hu moment is compared with a database of run-length encoded data corresponding to plates and run-length encoded data corresponding to nonplates.

2. The system of claim 1, wherein the comparison is performed using a projection.

3. The system of claim 1, further comprising a region classification unit that stores car plate coordinates in a detected plates coordinates memory.

4. The system of claim 1, further comprising a digit output unit that outputs digits of the car plate.

5. The system of claim 1, further comprising outputting digits of the car plate.

6. A method comprising:
receiving one or more images from a camera;
identifying car plates from the one or more images captured by the camera;
utilizing region classification to determine whether a region within the one or more images is a car plate or is not a car plate, wherein the region classification is based upon pattern recognition using normalized central Hu moments determined in the run-length encoded domain where a feature vector comprised of each Hu moment is compared with a database of run-length encoded data corresponding to plates and run-length encoded data corresponding to nonplates.

7. The method of claim 6, wherein the comparison is performed using a projection.

8. The method of claim 6, further comprising storing car plate coordinates in a detected plates coordinates memory.

9. The method of claim 6, further comprising outputting digits of the car plate.

* * * * *